Oct. 19, 1965  H. J. CHALL ETAL  3,212,704
MULTIPLICATION CONTROL FOR CALCULATING MACHINE
Filed Nov. 17, 1961  23 Sheets-Sheet 19

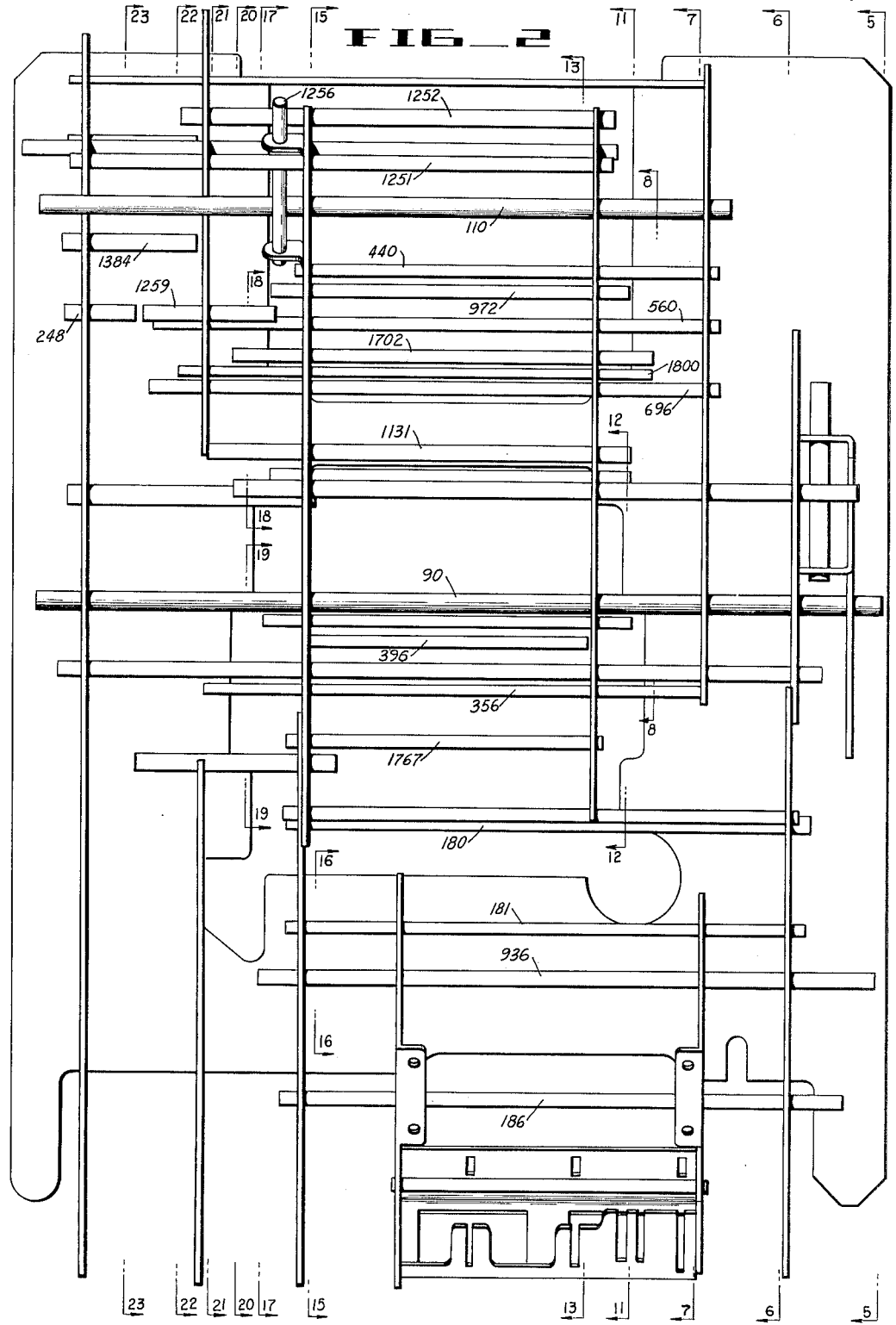

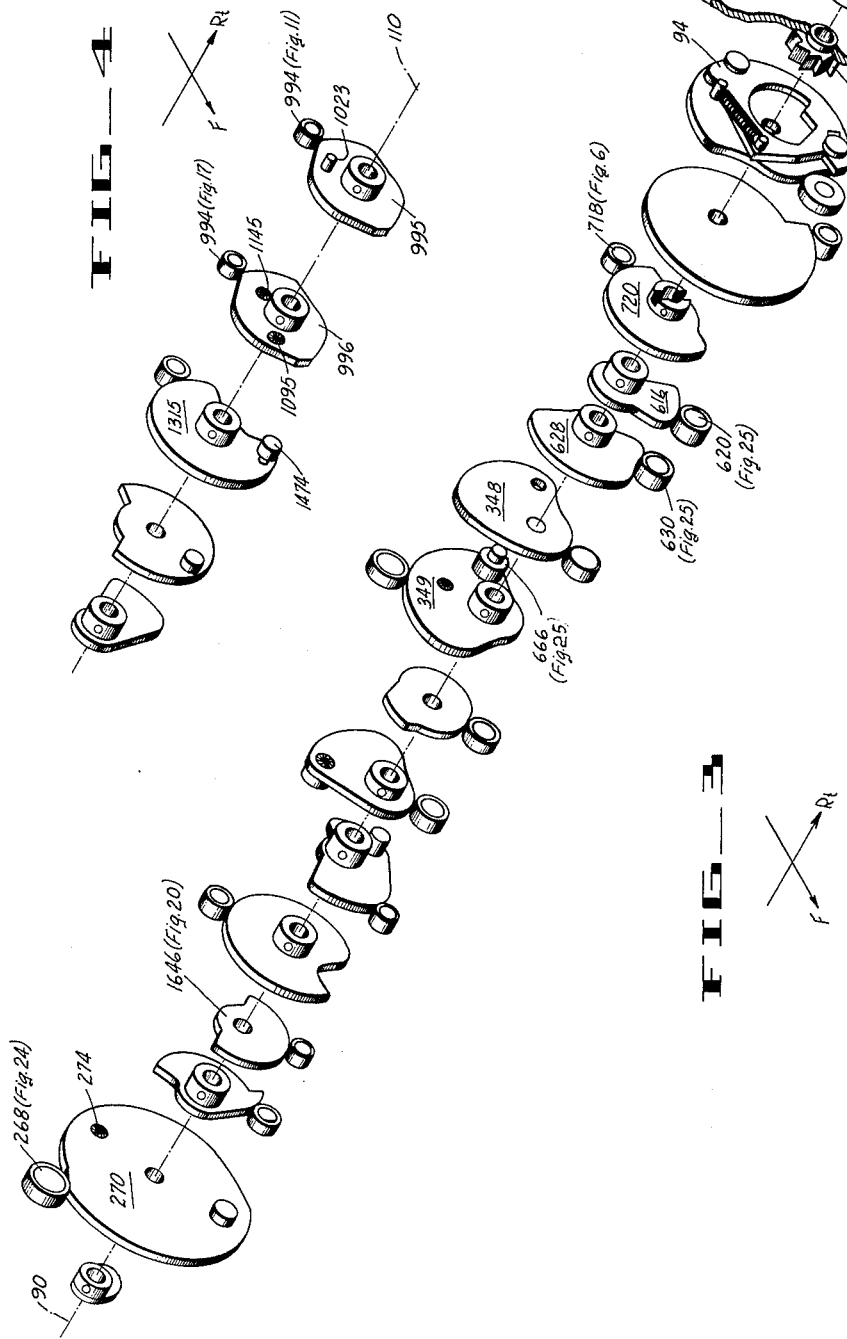

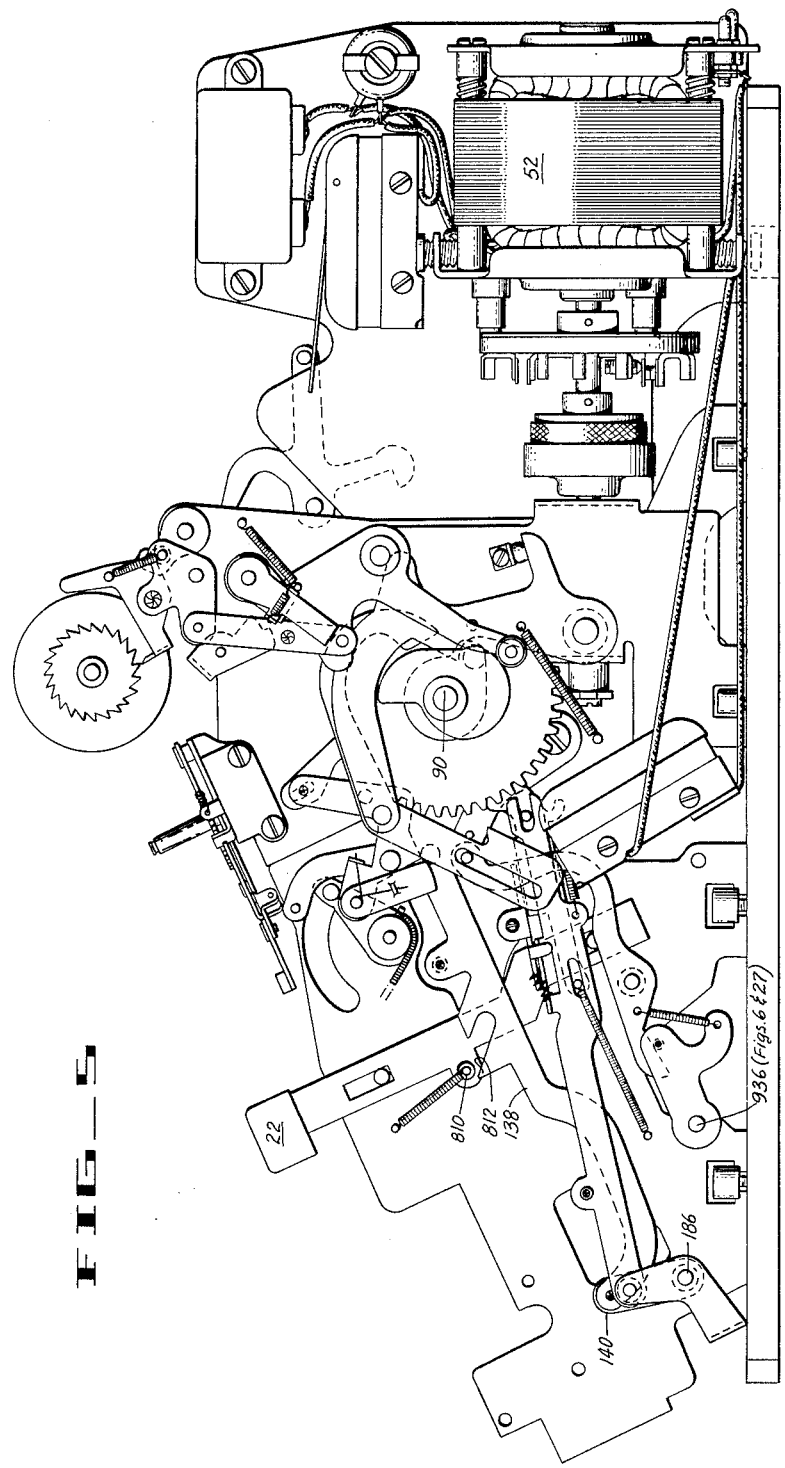

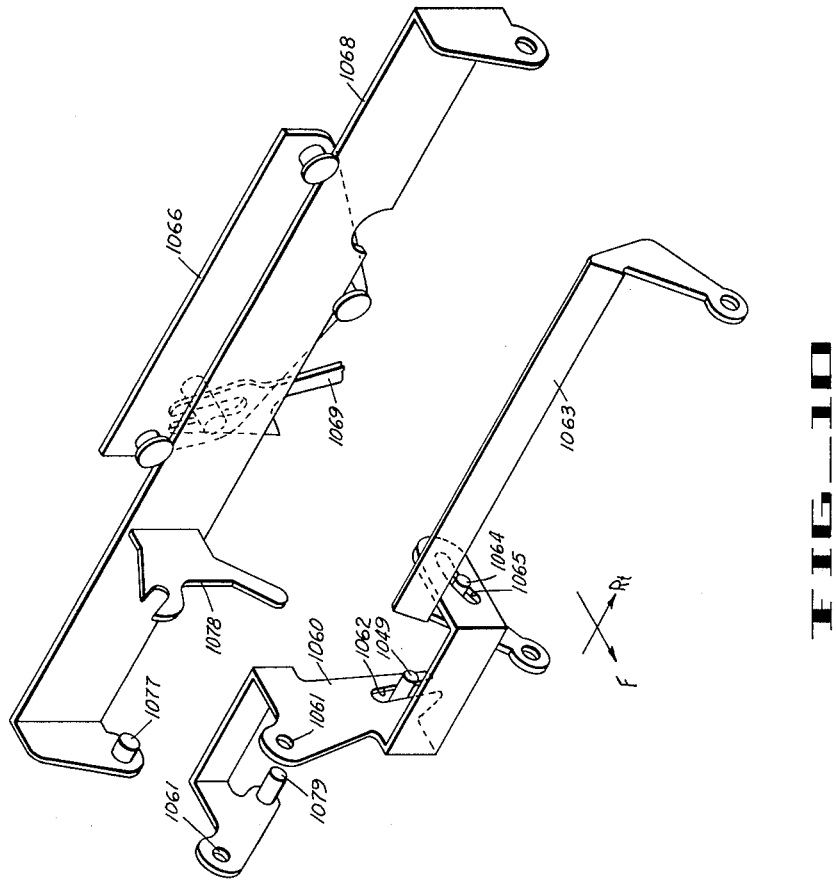
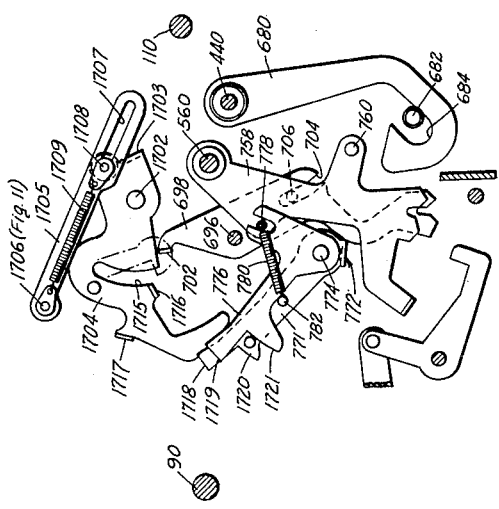
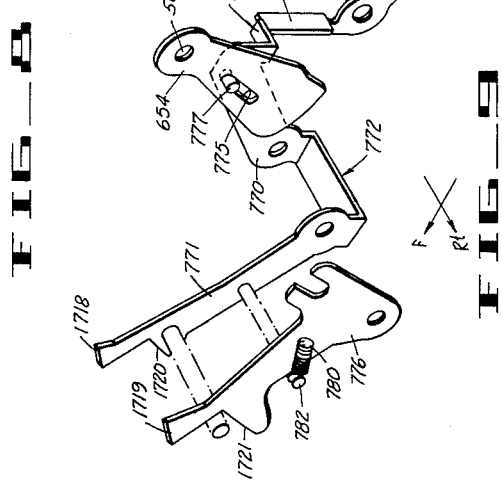

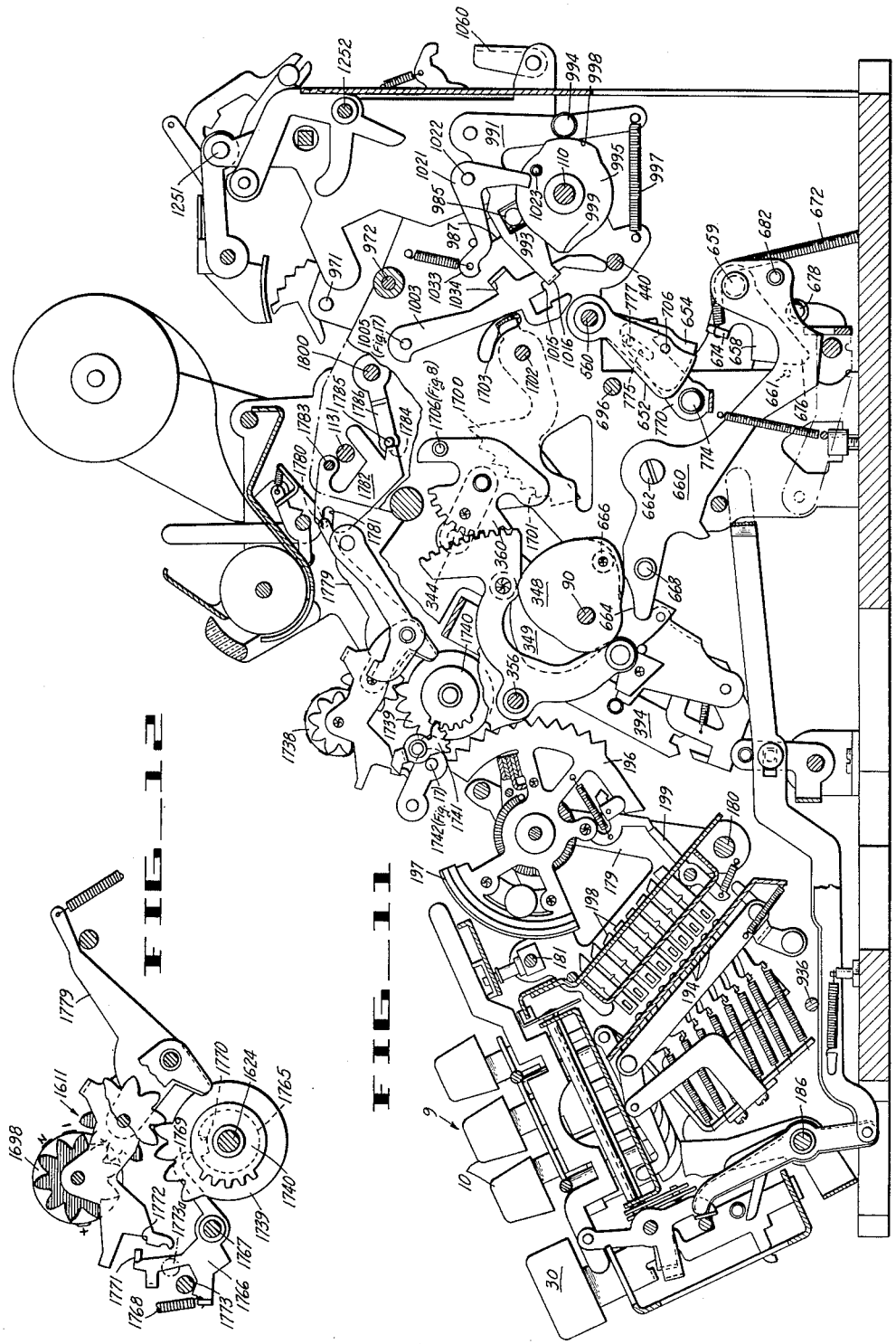

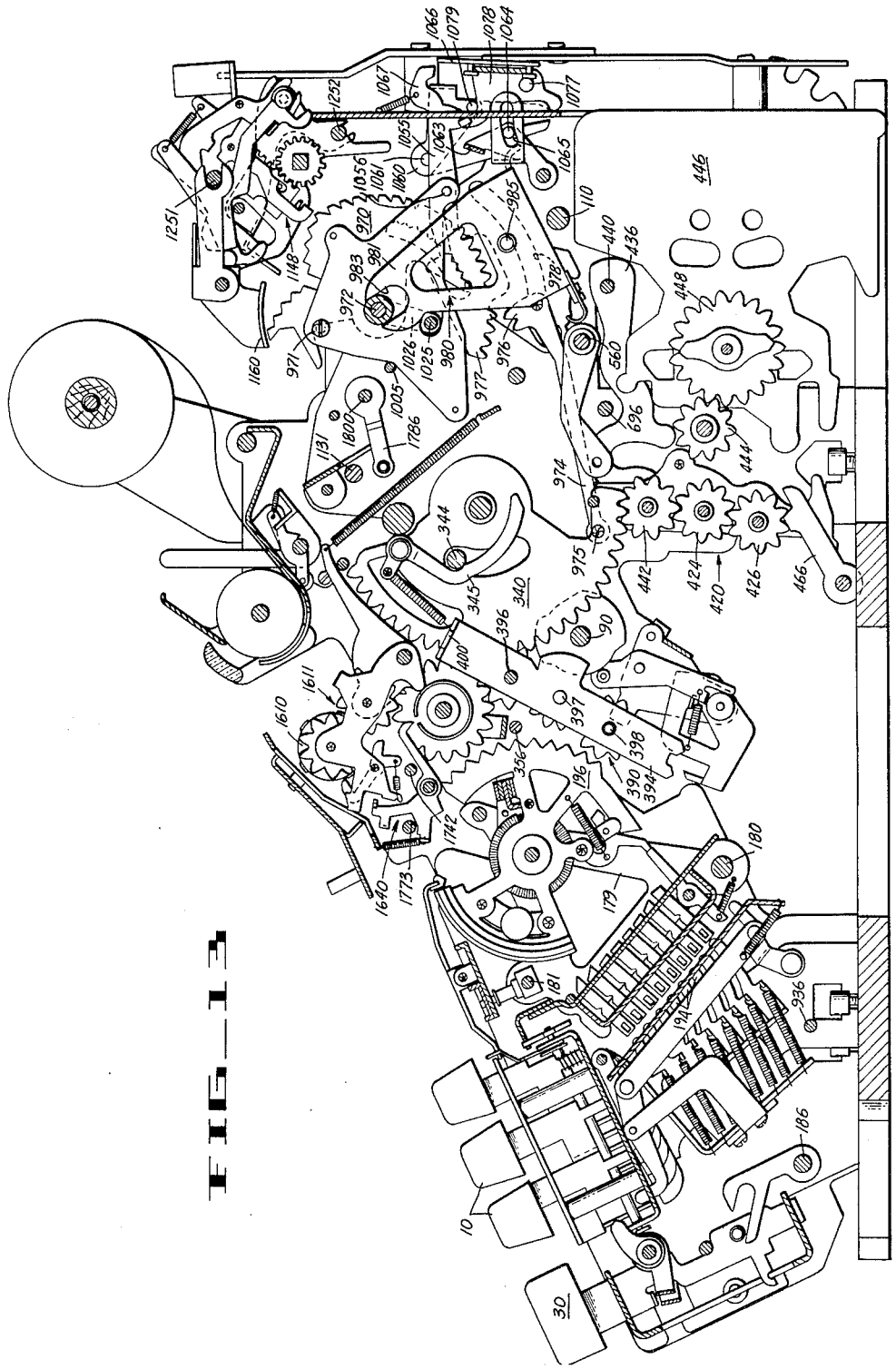

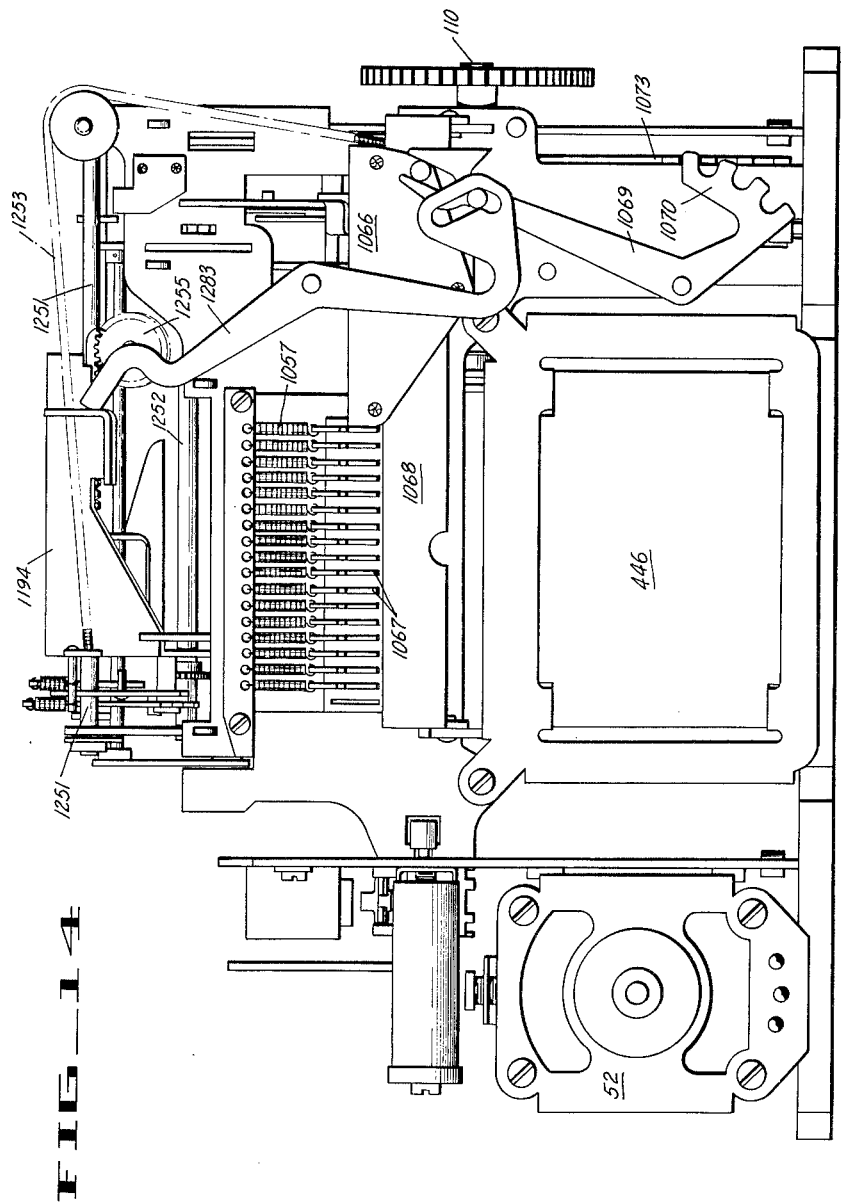

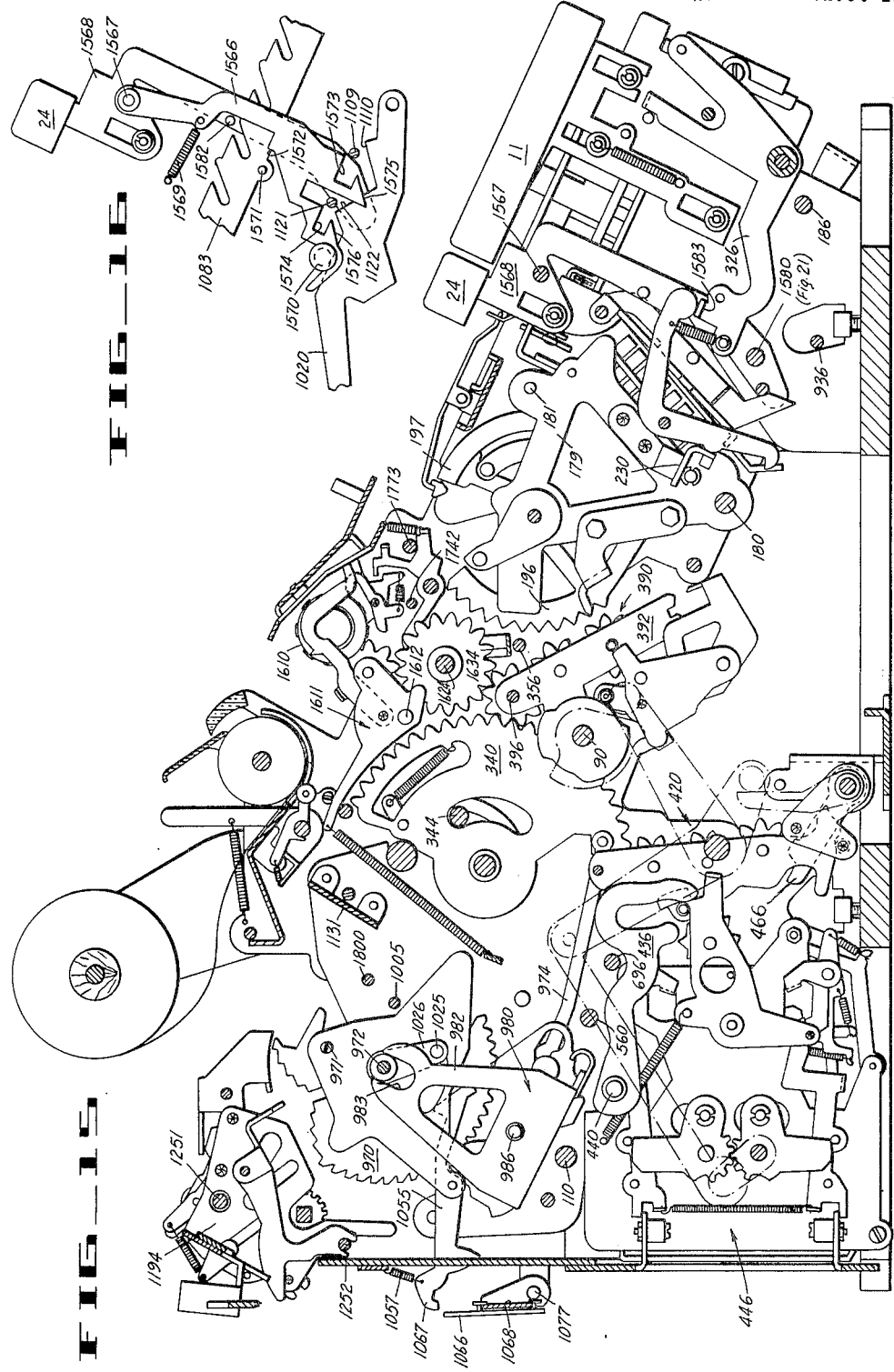

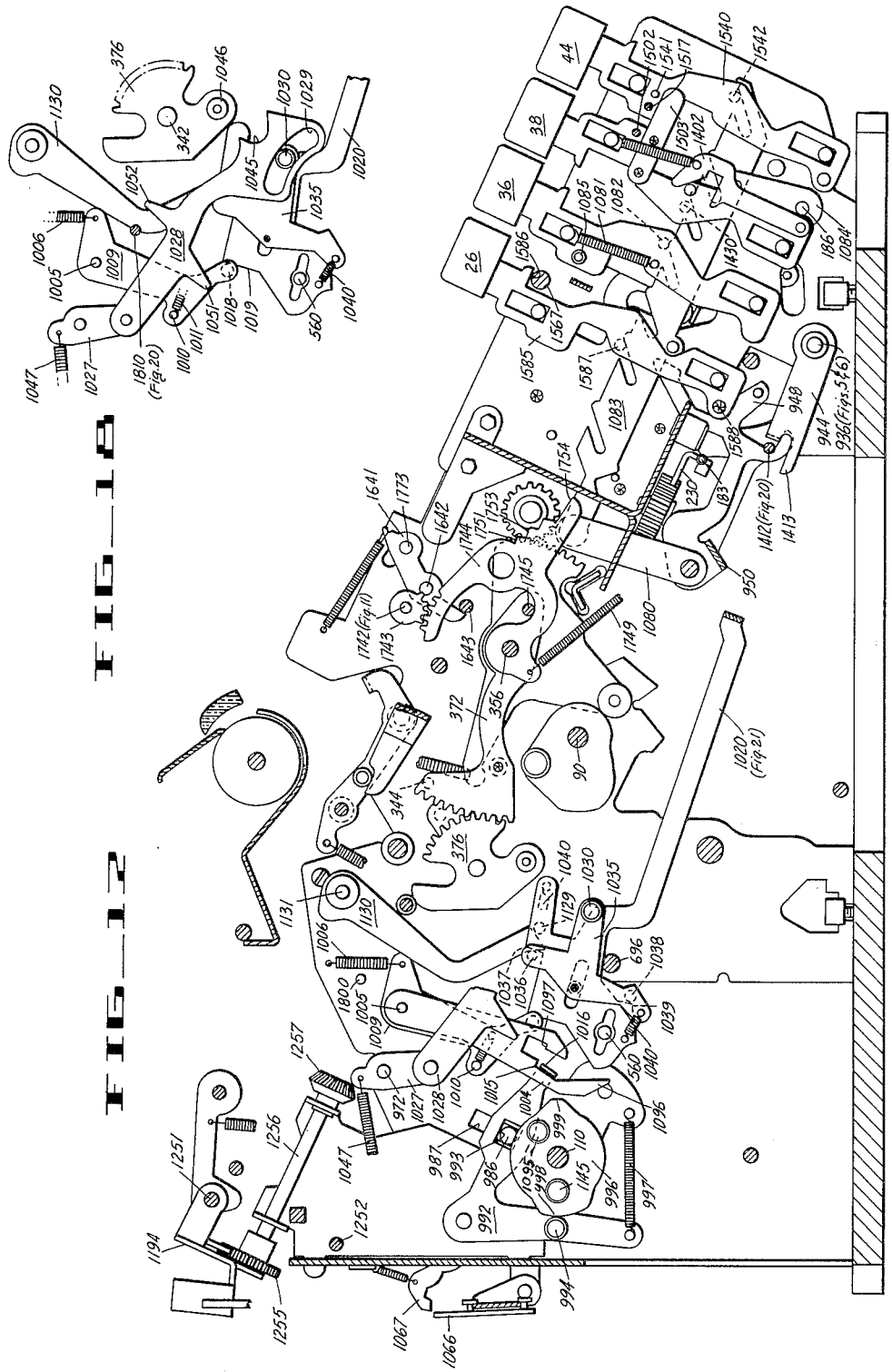

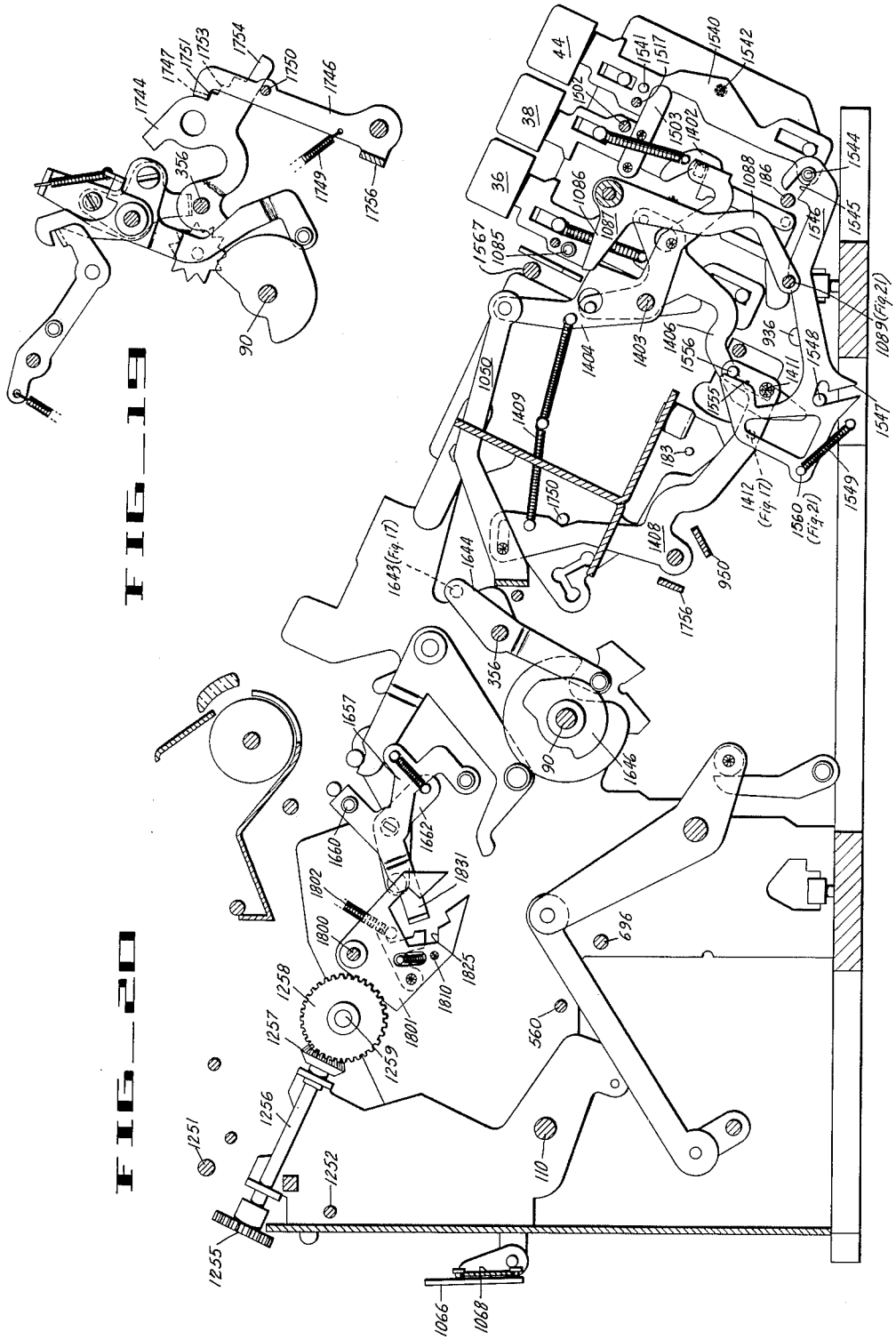

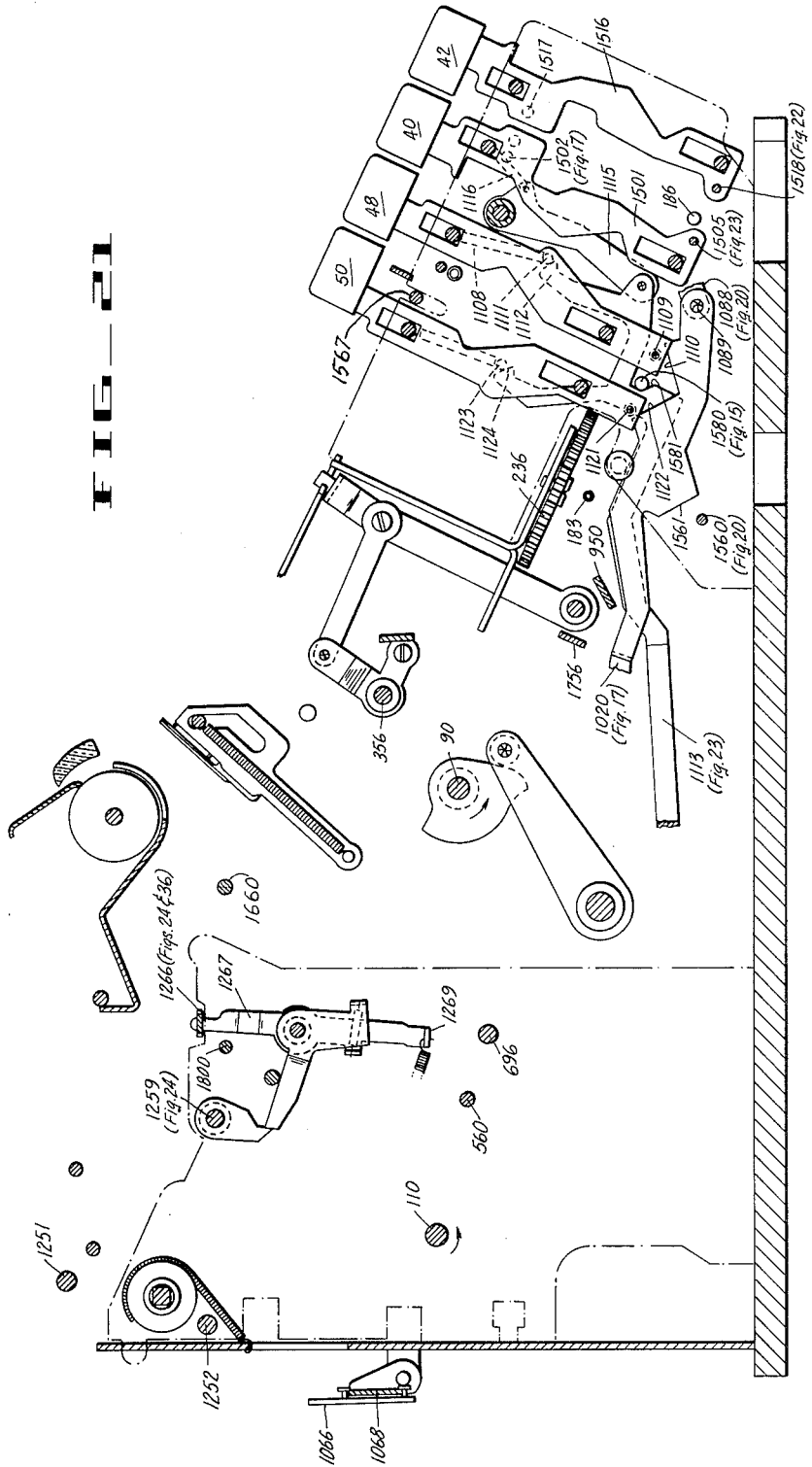

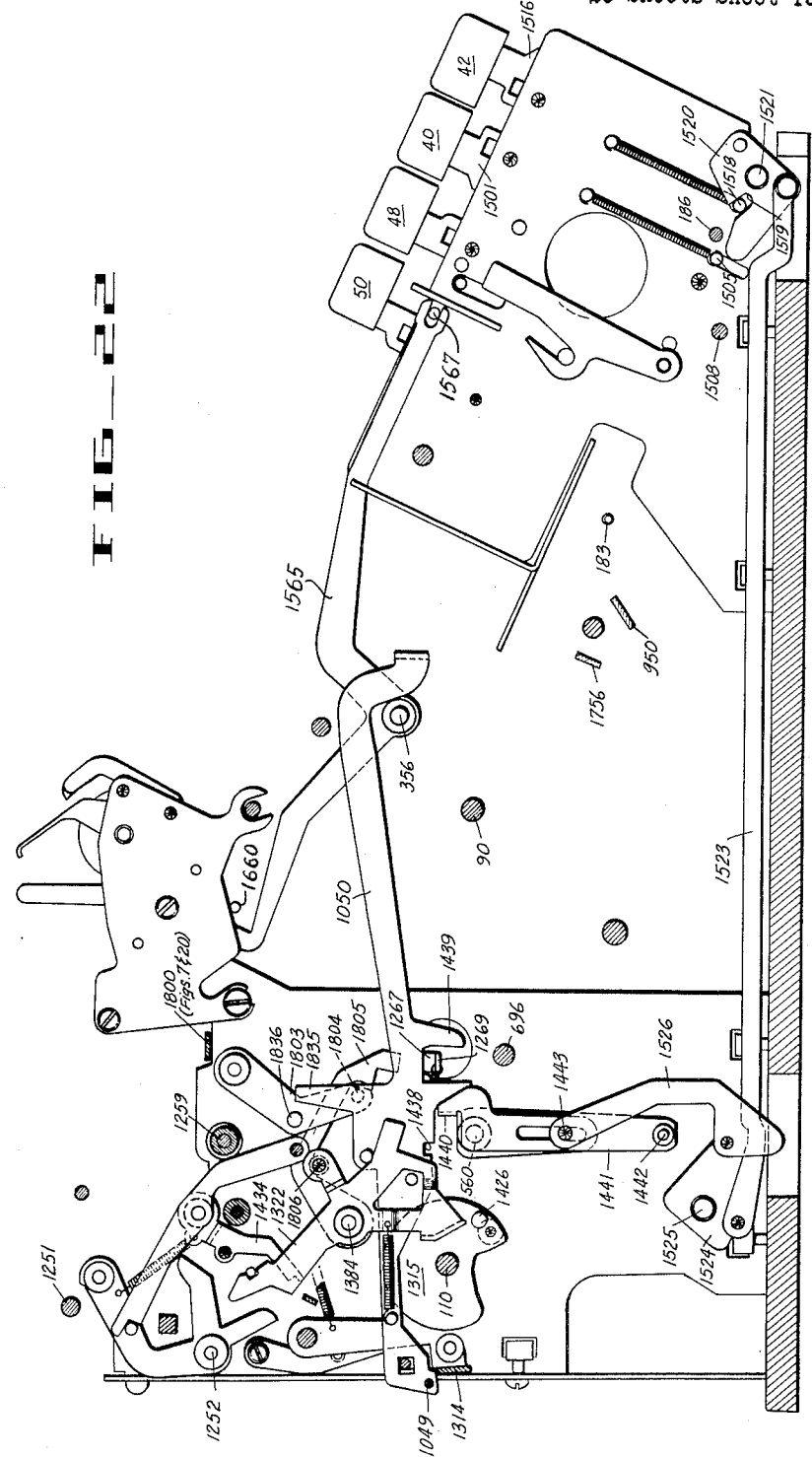

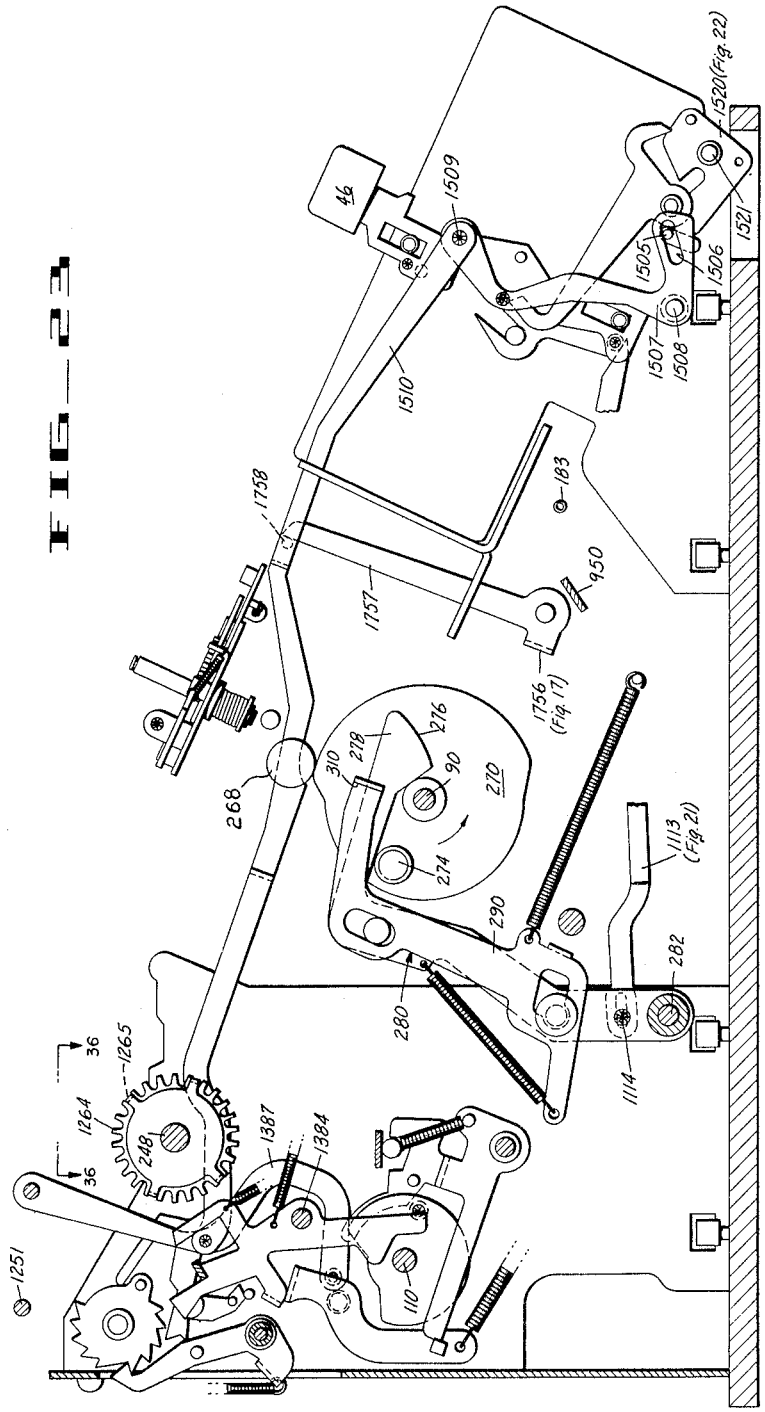

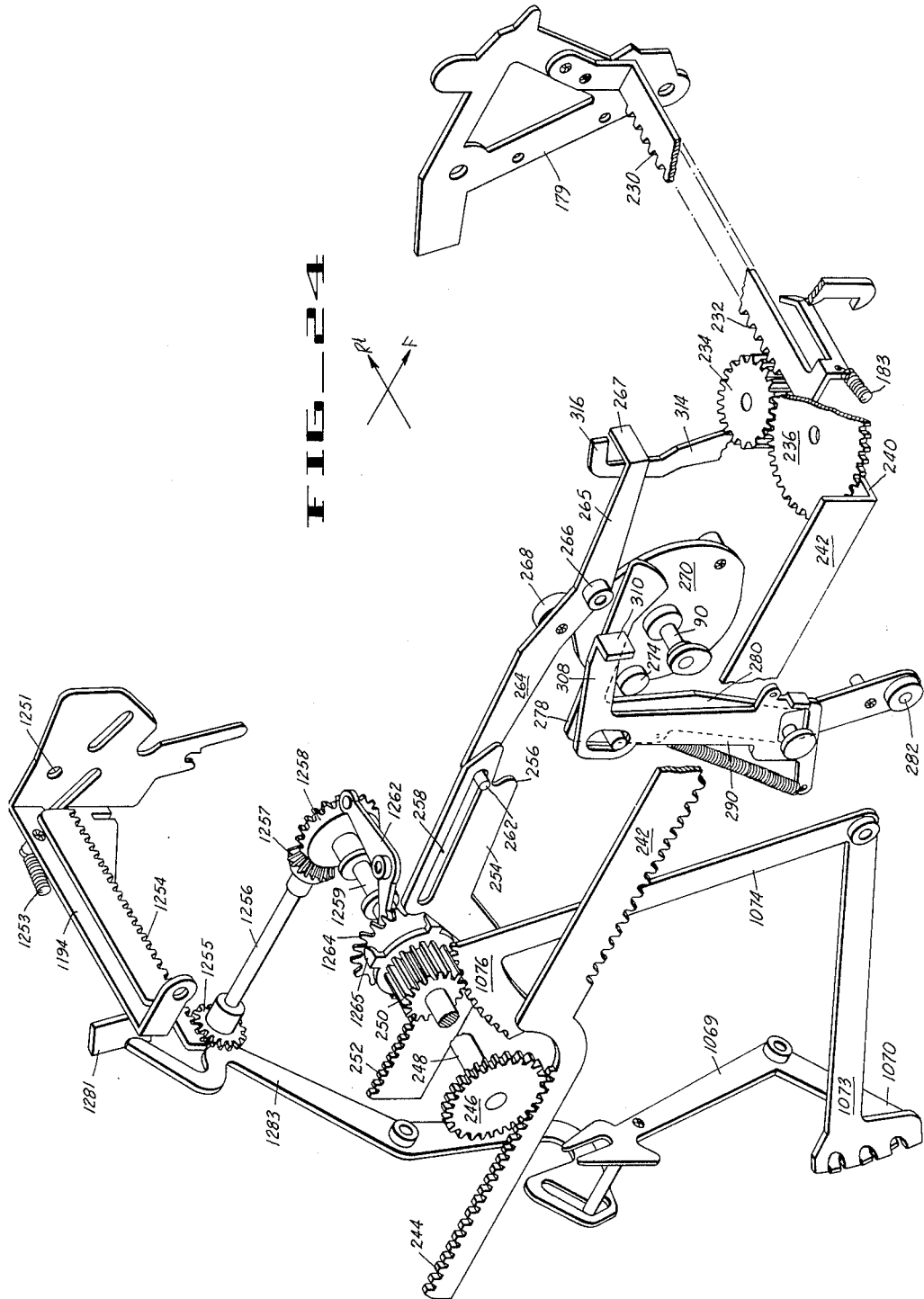

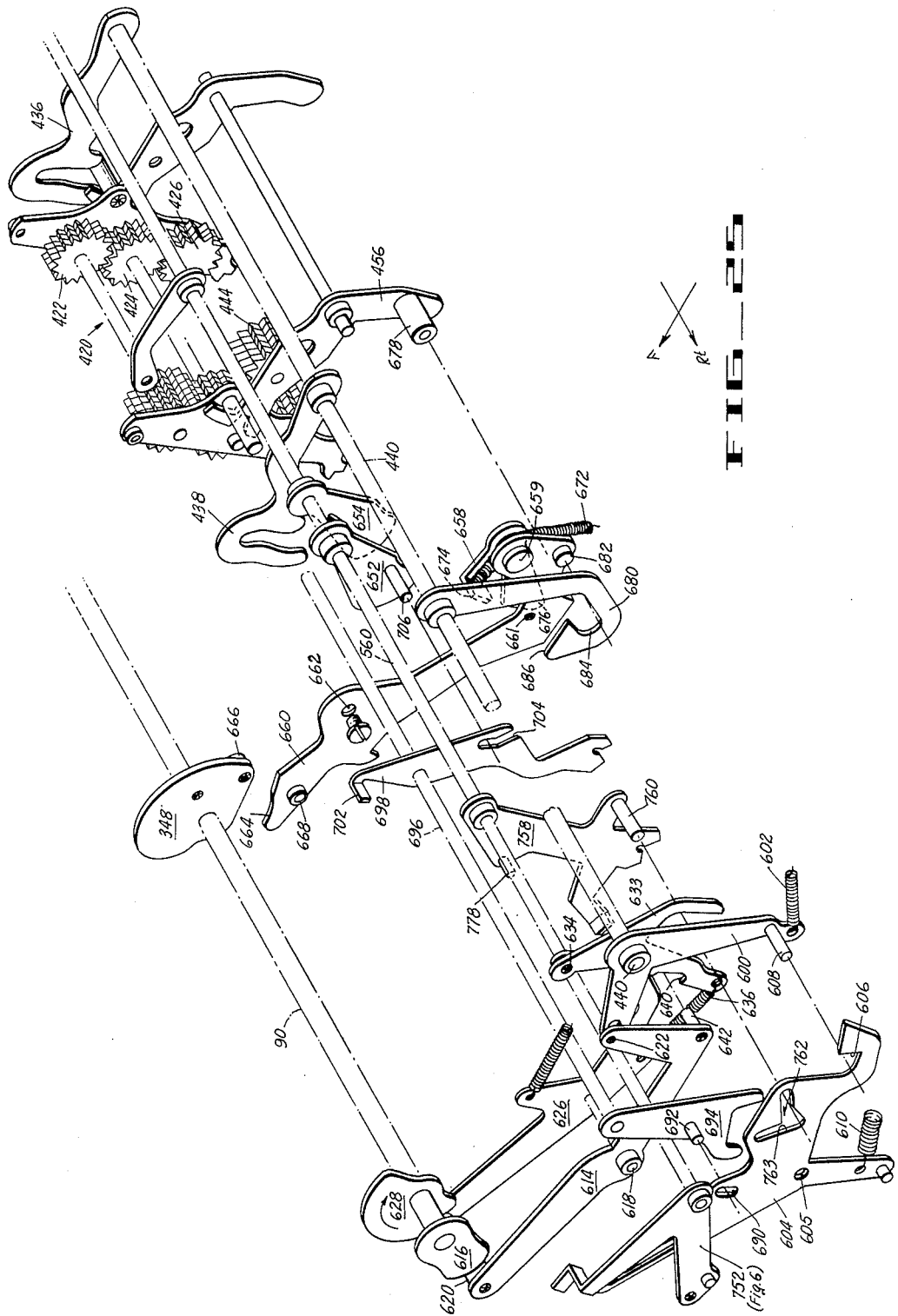

Oct. 19, 1965   H. J. CHALL ETAL   3,212,704
MULTIPLICATION CONTROL FOR CALCULATING MACHINE
Filed Nov. 17, 1961   23 Sheets-Sheet 21
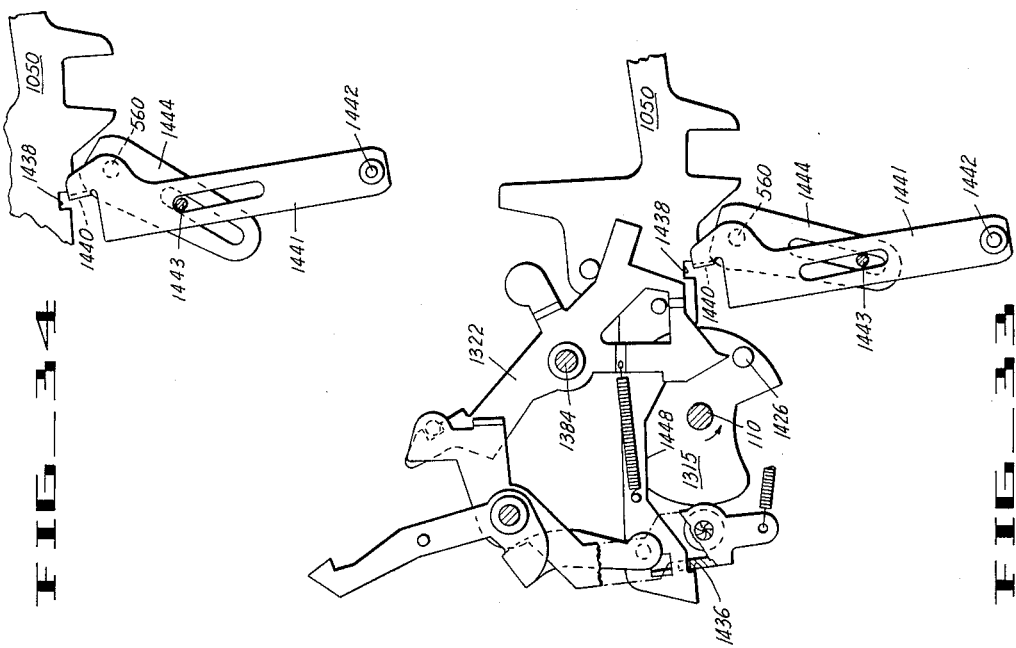
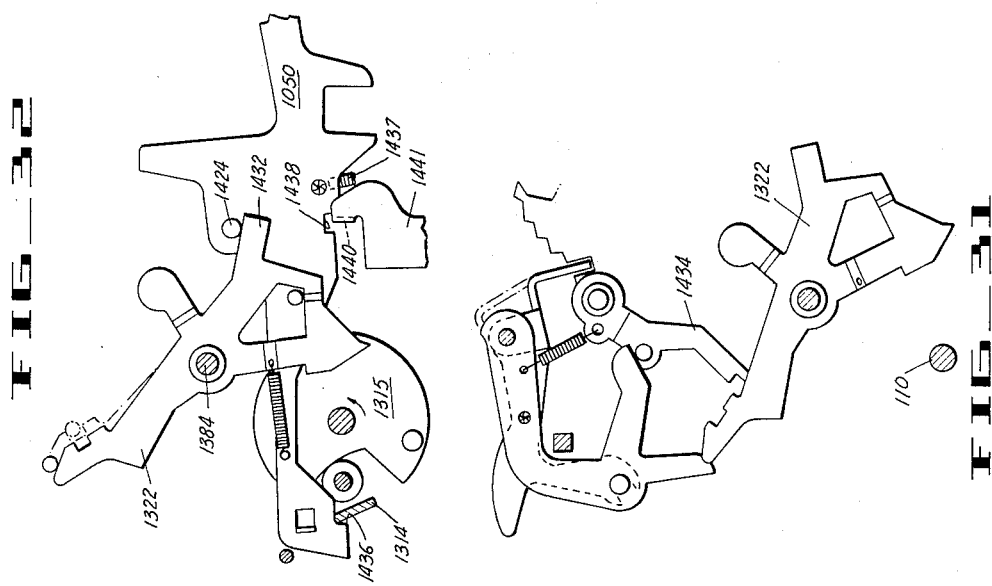

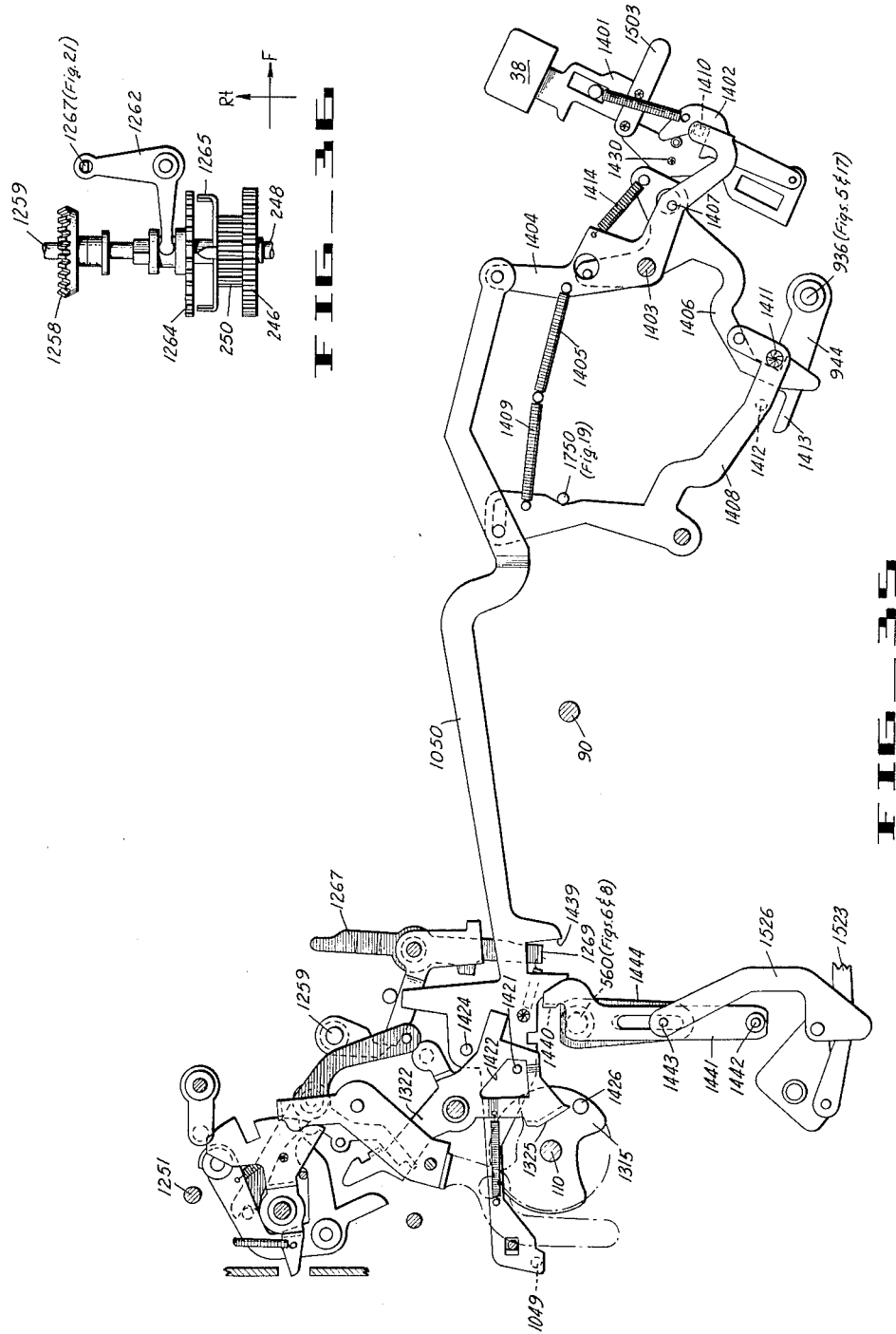

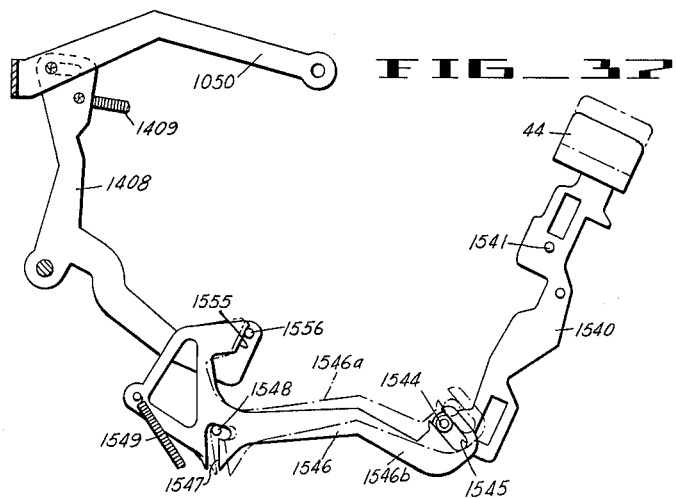
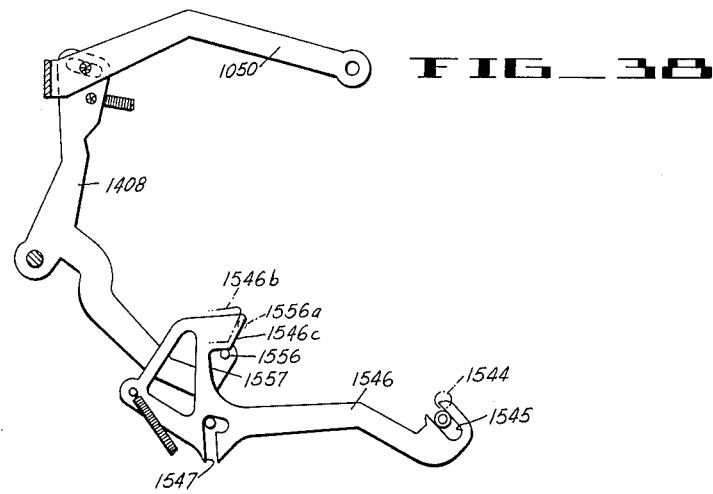
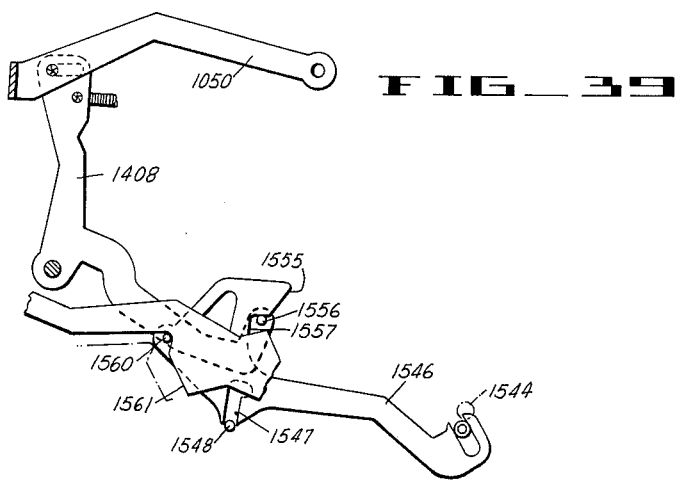

United States Patent Office 3,212,704
Patented Oct. 19, 1965

3,212,704
MULTIPLICATION CONTROL FOR
CALCULATING MACHINE
Harold J. Chall, Castro Valley, and George W. Bowers, Jr., Hayward, Calif., assignors, by mesne assignments, to Friden, Inc., San Leandro, Calif., a corporation of Delaware
Filed Nov. 17, 1961, Ser. No. 153,109
13 Claims. (Cl. 235—60)

The present invention relates to automatic printing calculating machines.

The present invention is embodied in the same machine that is disclosed more fully in the copending applications of Harold J. Chall, Serial No. 138,645, filed September 18, 1961, now Patent No. 3,145,923 and of Harold J. Chall and Charles W. Wiedeman, Serial No. 117,096, filed June 14, 1961, now Patent No. 3,108,745, issued October 29, 1963, to which reference is made for supplementing the description herein. For convenience, identical parts are identified by the same reference numerals in this and in those copending applications. The calculating machine of the present invention constitutes an improvement on the well-known Friden ten-key adding machine, shown, for example, in Chall, Patent No. 2,832,-530, and includes mechanism for automatically carrying out multiplication and for registering the results thereof in various manners.

It is an object of the present invention to provide an improved calculating machine that requires a minimum number of blocking interlocks among the operating keys, that responds to certain combinations of simultaneously depressed keys by performing preferred operations and rejecting others, that permits some combined operations and rejects others, and that automatically substitutes corrective operations for certain rejected operations.

A further object of the invention is the provision of an improved calculator that permits numbers involved in other machine operations to be entered into a multiplier-storage register and that permits the automatic transfer of a product, or the contents of a product accumulator, to a multiplier register for facilitating "chain multiplication."

It is a further object to provide a multiplying machine that has a simple control for the symbols that identify specific operations, that has a simple control for printing the correct symbols for multiple key operations and for corrective operations, and that has a symbol control responsive to the machine operations themselves.

A further object is the provision of an automatic multiplying machine in which an automatic test determines whether a multiplication problem is within the capacity of the machine, for permitting multiplication or alternatively producing a corrective operation, as by reducing the over-capacity condition, and in which the multiplier-storage register is locked during multiplication.

And it is a further object of the present invention to provide an improved high speed printing calculator, and improved controls therefor.

These and other objects and advantages of the present invention will be apparent from the following description of a specific embodiment thereof, and from the claims, taken in connection with the accompanying drawings in which:

FIG. 2 is a skeleton plan view of the machine, showing the locations of certain of the frame members and shafts.

FIGS. 3 and 4 are exploded perspective views from the upper right front showing the cams on the main drive shaft and rear drive shaft, respectively.

FIG. 5 is a right elevational section taken along the line 5—5 of FIG. 2, showing particularly part of the drive system and clutch control.

Figure 6:
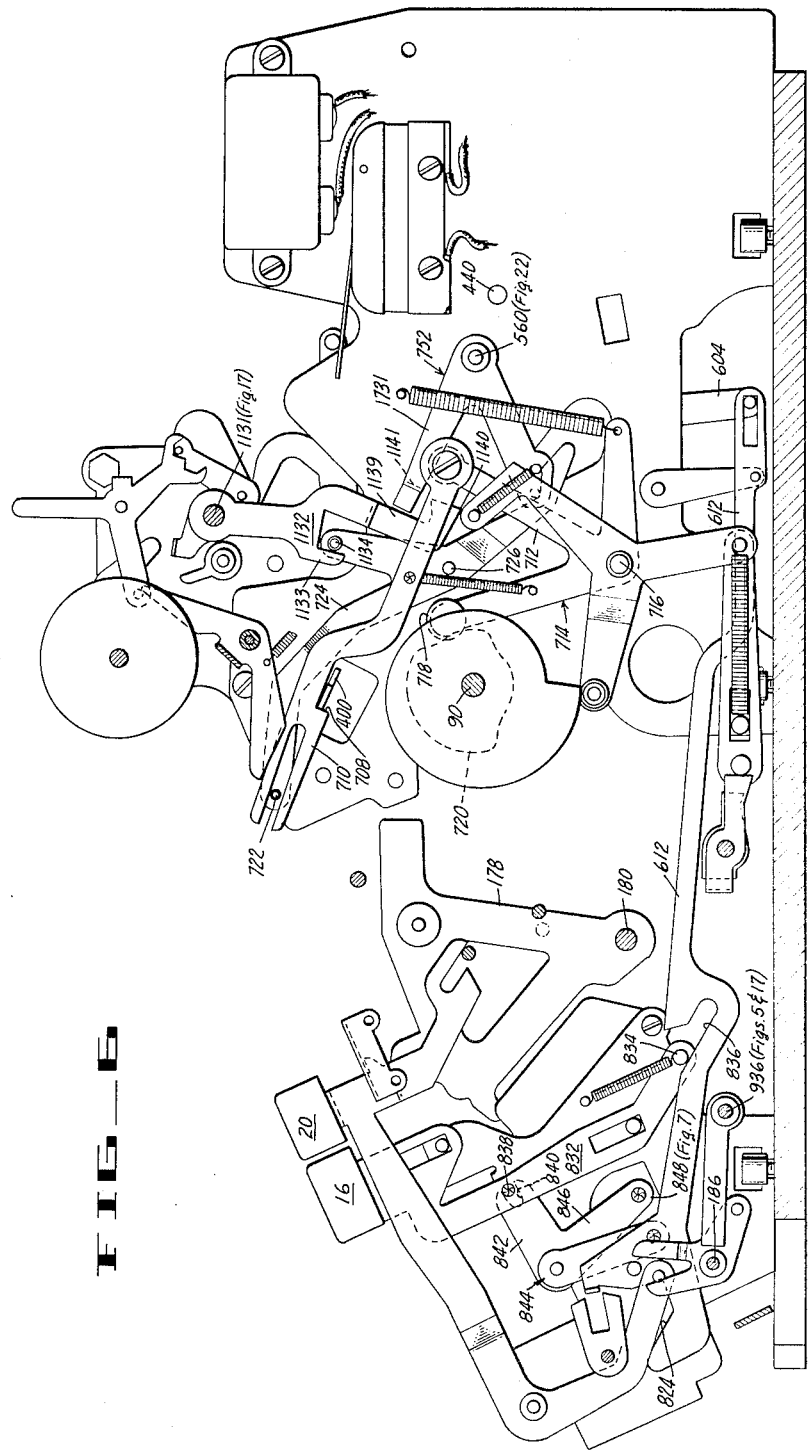
Figure 7:
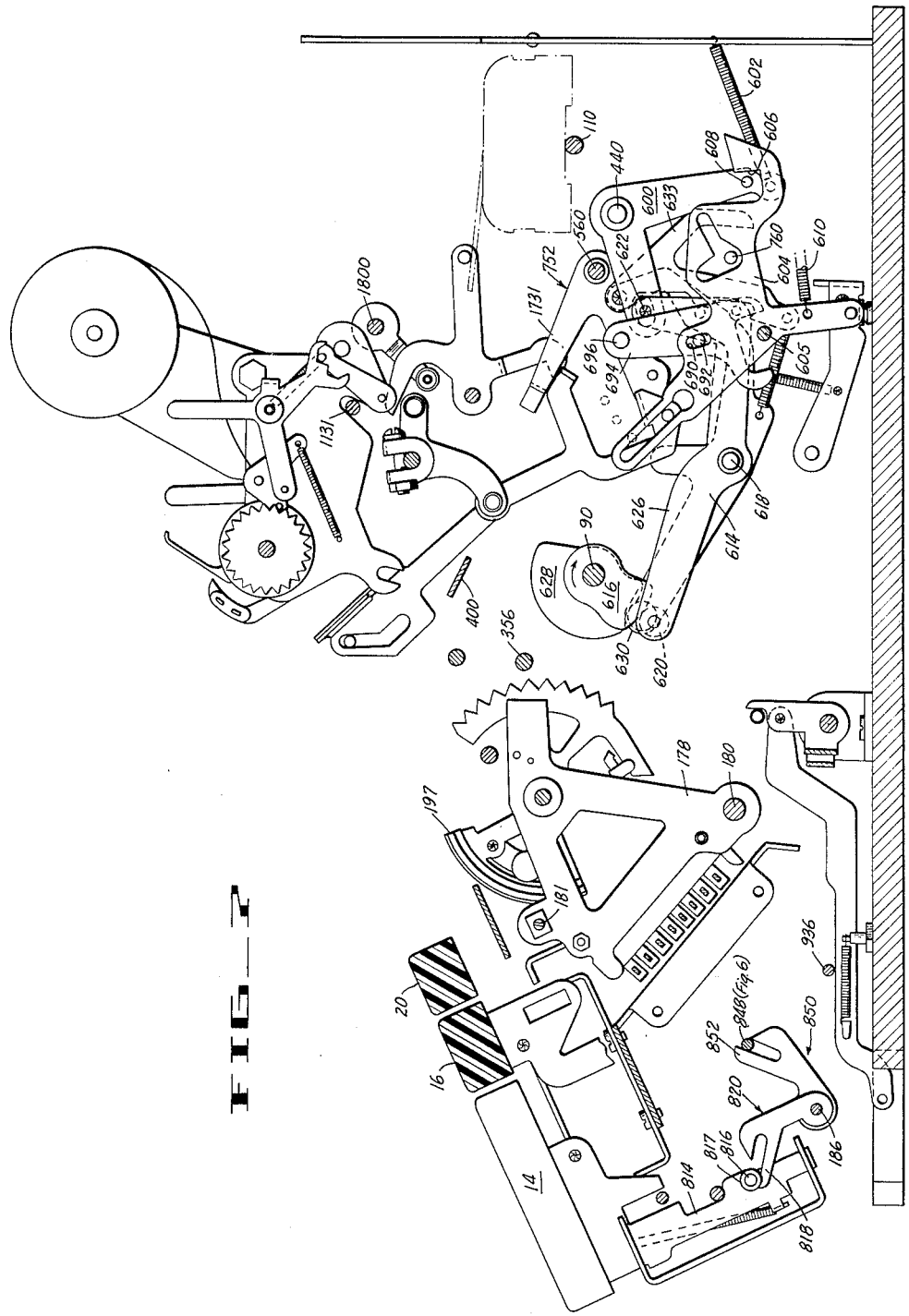

FIGS. 6 and 7 are right elevational sections taken along the lines 6—6 and 7—7, respectively, in FIG. 2, showing, for example, some of the mechanism for accumulator entries and total operations.

FIG. 8 is a right elevational partial section taken along the line 8—8 of FIG. 2, also showing mechanism for accumulator entries and totals.

FIG. 9 is an exploded perspective taken from the upper right rear for explaining the operation of the mechanism appearing in FIGS. 8 and 11, for testing the sign of the number in the accumulator.

FIG. 10 is an exploded perspective taken from the upper right front showing parts of the multiplication mechanism which appear also, for example, in FIG. 13.

FIG. 11 is a right elevational section taken along the line 11—11 in FIG. 2.

FIG. 12 is a right elevational partial section taken substantially along the line 12—12 of FIG. 2 for showing the mechanism for blocking the symbol print wheel for the right side controls.

FIG. 13 is a right elevational section taken along the line 13—13 in FIG. 2.

FIG. 14 is a rear elevation of the machine.

FIG. 15 is a left elevational section taken along the line 15—15 of FIG. 2.

FIG. 16 is a left elevational partial section taken along the line 16—16 of FIG. 2.

FIG. 17 is a left elevational section taken along the line 17—17 in FIG. 2.

FIG. 18 is a left elevational partial section taken along the line 18—18 in FIG. 2, showing the mechanism for operating the clearing bail of the multiplier-storage, or memory, unit.

FIG. 19 is a left elevational partial section taken substantially along the line 19—19 in FIG. 2, showing parts of the print wheel aligner and the left side symbol control.

FIGS. 20 to 23, inclusive, are left elevational sections taken along the lines 20—20 to 23—23, inclusive, in FIG. 2, showing particularly parts of the multiplication control and carriage control mechanisms.

FIG. 24 is a perspective from the upper left front showing the mechanism for interconnecting and controlling the carriages for the selector unit and the multiplier control unit.

FIG. 25 is an exploded perspective view from the upper right rear showing certain parts of the mechanism that control the entry into, and readout from, the accumulator.

Figure 27:
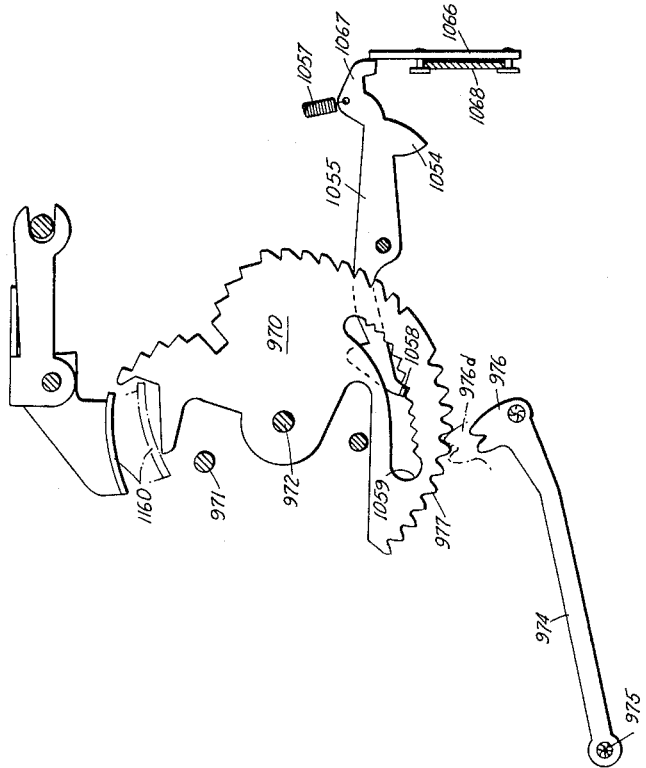
Figure 26:
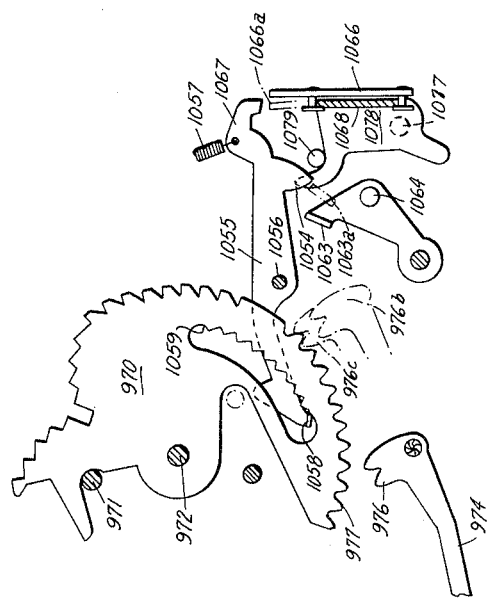

FIGS. 26 and 27 are enlarged right elevational details for explaining the operation of the multiplier-storage, or memory, unit.

FIGS. 28 to 34, inclusive, are enlarged left elevational views for explaining the operation of the multiplication control mechanism.

FIG. 35 is a left elevational fragmentary section showing part of the mechanism of FIGS. 20, 21 and 22.

FIG. 36 is a top detail view indicated substantially by line 36—36 in FIG. 23.

FIGS. 37 to 39, inclusive, are left elevational views of part of the product transfer (total "T" to multiplication "X") mechanism of FIG. 20 for explaining its operation.

I. GENERAL OPERATION

The calculating machine shown in the drawings is of the ten-key, actuator type, and in its general features is constructed in accordance with U.S. Patent No. 2,832,-530, and is similar to the well-known Friden adding machine.

A number may be entered in a movable selector unit by means of selection keys 9 (FIG. 1), which include the nine numeral keys 10 and the zero key 11, and the number so entered appears in a check window 12 on the check dials 197 of the selector segments 196 (FIG. 11). Depression of an addition key 14 or a subtraction key 16 then initiates an operation that transfers the number to the actuator and also to the accumulator, and prints it, the operation clearing the number from the selector unit. Depression of a repeat (R) key 20 causes a number in the selector to be entered additively in the accumulator without clearing it from the selector. Simultaneous depression of the repeat key 20 and substract key 16 similarly enters the number subtractively into the accumulator without clearing it from the selector. A print-only (N) key 22 causes the number in the selector to be printed and cleared. A clear keyboard (CKB) key 24 causes the number in the selector to be simply cleared therefrom by returning the selector unit to its home position. A backspace key 26 causes the movable selector carriage to move one space to the right and clear out the digit last entered. A depression of a total (T) key 30 causes the number in the accumulator to be transferred to the actuator and to be printed, leaving the accumulator clear. Depression of a subtotal (S) key 32 similarly transfers the value from the accumulator to the actuator for printing, but in addition returns it to the accumulator.

With a number in the selector unit, and showing in the check window 12, depression of a multiplier-entry (X) key 36 transfers the number from the selector to the actuator, and also to a multiplier-storage, or memory, unit 970 (FIG. 13) and prints the number, leaving the selector clear. A multiplicand may then be entered in the selector by means of selection keys 9. Then depression of a multiplication (=) key 38 causes the multiplicand to be printed once, the multiplication to be performed automatically, the product to be accumulated additively in the accumulator and the number of the accumulator to be printed out in a total operation. Alternatively, the multiplication operation may be initiated by the depression of an accumulative multiplication (=S) key 42, which causes a similar multiplication operation but ends with a subtotal operation, thereby leaving the accumulated product in the accumulator. Depression of a negative multiplication (—=) key 40 causes an operation similar to that of multiplication key (=) 38, but enters the product negatively in the accumulator. A depression of a product transfer (T to X) key 44 produces the same operation as the multiplication key 38, with the addition that the final value in the accumulator is transferred to the multiplier-storage, or memory, unit. Any combination of the keys 38, 40, 42 and 44 may be depressed simultaneously.

With a number in the selector, a squaring entry ($X^2$) key 46 may be depressed to cause the number in the selector to be entered in the multiplier-storage unit and also retained in the selector. Then any of the keys 38, 40, 42 or 44 may be depressed to cause an automatic multiplication for producing the square of the number.

A memory input (MI) key 48 and a memory output (MO) key 50 are preparatory keys and do not, by themselves, cause an operation of the machine. The memory input key 48 may be depressed previously to, or simultaneously with, keys 14, 16, 20, 22, 30 or 32 to cause the number that is printed to also be entered in the multiplier-storage, or memory, unit. The memory output key 50 may similarly be used with the print-only key 22 for printing out the number standing in the multiplier-storage unit. The memory output key 50 may also be used with either the addition key 14 or subtraction key 16 for printing the number in the multiplier-storage unit and entering it additively or subtractively, respectively, into the accumulator. No memory output operation leaves the multiplier-storage unit clear. The number is transferred from the multiplier-storage, or memory, unit to the actuator for printing, and then is returned to the multiplier-storage unit. Clearing of the storage unit is performed only in preparation for the entry of a new number.

II. DRIVE SYSTEM

As described in greater detail in the copending applications previously referred to, and as shown in FIGS. 11 and 13, the machine includes a main drive shaft 90 and a rear drive shaft 110 which are geared to rotate in synchronism and at the same speed. A drive mechanism of a well-known construction, including an electric motor 52 (FIG. 5) and a dog clutch 84, 94 (FIG. 3) is provided for driving the shafts (clockwise in these figures) in integral cycles. FIG. 3 shows the drive gear, dog clutch, and control cams on the main drive shaft 90. FIG. 4 shows the control cams on the rear drive shaft 110. The machine operates automatically through one cycle for each of the operations of the addition, subtraction, print-only, total, subtotal, clear keyboard, backspace, multiplier entry and squared entry. Multiplication and repeat operations involve two or more integral cycles.

III. SELECTION UNIT

The selection unit is similar to the constructions shown in U.S. Patents, Nos. 2,371,752, 2,832,530 and 2,832,532. A stationary portion includes the digit keys 9 (FIG. 1) and setting levers 194 (FIGS. 11 and 13), the location of which constitutes a selection station. A selection carriage, including right and left frame members 178 and 179 (FIGS. 6 and 11), slides transversely on rods 180 and 181, and is spring-biased toward the left by a spring 183 (FIGS. 17 and 24). The carriage also includes a selection sector 196 in each of sixteen numerical orders, and a column of stop pins 198 and a zero latch 199 for each sector. As is explained in the prior patents referred to, initially, the leftmost order to the selector is aligned with the setting levers 194 at the selection station. Depression of one of the digit keys 10 differentially sets the selector segment 196 of that order in accordance with the number, and operates an escapement for indexing the carriage one order to the left to bring that order into alignment with the rightmost order of the actuator, and to bring the next order of the selector carriage in line with the setting levers 194. Each selector sector 196 carries a check dial 197 bearing numerals which are exposed through the check window 12 for showing the number set in the selector unit. Thus, the selector carriage is indexed to the left order-by-order as the digits of the number are entered one at a time, most significant digit first. The carriage is also indexed to the left during multiplication.

IV. HOMING THE SELECTION CARRIAGE

In FIG. 24, the left frame member 179 of the selector carries an angle bar 230 which extends to the left. This bar includes a rearward facing rack portion 232 which is coupled through a pair of gears 234 and 236 to a rack portion 240 of longitudinal angle bar 242 suitably guided for longitudinal motion. The rear end of this bar carries an upward-facing rack 244 which meshes with a gear 246 fixed to a shaft 248, which also carries a broad-faced gear 250. In mesh with this gear 250 is the upward-facing rack 252 of an interponent 254. This interponent has a longitudinal slot 258 for receiving a guide pin 262 carried by lever 264 journalled at 266. Lever 264 carries a roller 268 which rides on the cam 270 on the main drive shaft 90. Cam 270 carries a roller 274 which, during the second half of each machine cycle, is driven by the rotation of the cam (counterclockwise in FIG. 24) against the forward end 276 (FIGS. 23 and 24) of a forward extending arm 278 of a lever 280 journalled to the machine frame at 282. Lever 280 carries an overload-release lever 290 which includes a forward extending arm 308 with a left extending ear 310 at its forward end. An abutment face 256 at the forward end of interponent 254 is arranged to be engaged and driven by the ear 310 for returning the selector carriage to its extreme right, or home, position.

The mechanism in FIG. 24 is shown in its home position. When a number is entered into the selector unit by means of the entry keys 9 (FIG. 1), the selector carriage, and with it the frame member 179 (FIG. 24), moves to the left- order-by-order, as previously described. This leftward movement is transmitted by the rack 232 through the gears 234 and 236 to the longitudinal bar 242 which moves forward in the machine as the selector carriage moves left. This motion drives the gear 246, the shaft 248 and gear 250 (counter-clockwise in FIG. 24) and moves the interponent 254 forward. In this forward movement, the interponent is guided by the pin 262. During an addition operation, for example, the shaft 90 and the cam 270 rotate counter-clockwise in FIG. 24. The initial rotation of cam 270 out of its home position lowers the lever 264 and the interponent 254 to align the abutment 256 with the ear 310 on the lever 290. Then, slightly past the mid-point of the cycle, roller 274 abuts the cam surface 276 of the lever 280 to carry the ear 310 rearward against the abutment face 256, for driving the interponent 254 rearward, and through the connections previously mentioned, for driving the rack 232 and the selector carriage right, beyond it home position. Near the end of the cycle, roller 274 runs off the cam face 276, permitting the levers 280 and 290 to return to their home positions, and also permitting the selector carriage to move left to its home, or first selection, position. Also, near the end of the cycle, cam 270 lifts roller 268 for lifting the interponent 254 and raising the abutment 256 clear of the ear 310.

Lever 264 includes a forward extending arm 265 having an ear 267. A lever 314 has, at its upper end, a forward extending arm 316 arranged to be swung over the ear 267. During machine operations in which the number is not to be cleared out of the selector unit, such as repeat and multiplication, the arm 316 is swung over the ear 267 to prevent the lever 264 from being controlled by cam 270, and for holding the interponent 254 up and clear of the ear 310 on lever 290.

V. MULTIPLIER SENSOR CARRIAGE

As is more fully explained in the copending applications previously referred to, the machine of the present invention includes a carriage 1194 (FIG. 24) for the value sensor 1148 and the short-cut feeler 1160 (FIG. 13) which, during a multiplication operation, sense the digits stored in sectors 970 (FIG. 13) of a multiplier-storage unit.

Carriage frame 1194 (FIG. 24) slides on two transverse rails 1251 and 1252 (FIGS. 13 and 15), and is biased toward the left of the machine by a spring 1253 (FIG. 14). A gear rack 1254 (FIG. 24) carried by the carriage frame 1194 is in mesh with a spur gear 1255 on a shaft 1256 which carries a bevel gear 1257 in engagement with a second bevel gear 1258 on a shaft 1259 which is coaxial with the shaft 248. Shaft 1259 has a square portion carrying a sliding, toothed clutch plate 1264 with a groove engaged by a bellcrank 1262 (see also FIGS. 23 and 36). The teeth of the clutch plate 1264 are arranged to engage the teeth 1265 of a spider fixed to gears 246 and 250. During multiplication this clutch 1264, 1265 serves to connect the multiplier sensor carriage 1194 with the carriage of the selection unit. Engagement of the clutch 1264, 1265 (FIGS. 24 and 36) is controlled by a lever 1267 (FIGS. 35 and 36) which, in turn, is controlled by the main multiplication control bar 1050 (FIG. 35).

At the end of a multiplication operation the sensor carriage 1194 (FIG. 24) is restored to its home position by the same mechanism that restores the selector carriage. In FIG. 24, gear 250 is in mesh with a toothed portion 1076 of a bellcrank 1074, 1073 for driving a bellcrank 1070, 1069, which, in turn, drives a restore bellcrank 1283, which drives against an ear 1281 on the carriage 1194.

VI. ACTUATOR

An actuator of well-known construction includes seventeen ordinally arranged sectors 340 (FIG. 13) which are yieldingly urged, counter-clockwise in this figure, during the first half of each machine cycle and are driven, clockwise in this figure, to their home position, in which they are shown. Print wheels 1610, geared to the actuator sectors 340, print numbers in a well-known manner at about mid-cycle.

The actuator is arranged to be connected to the selector unit by means of a front gear pendant 390 of well-known construction. It includes a pair of frame members 392 (FIG. 15) and 394 (FIG. 13) supported on a transverse shaft 396. This shaft 396 and shafts 397 and 398 carry three gears for each order, the uppermost gear being permanently in mesh with the actuator sector 340 and the lowest gear being arranged for movement into and out of mesh with the selector sector 196. Frame member 394 carries, at its upper end, an ear 400 which is normally embraced by a notch 708 of a link 710 (FIG. 6) for moving the pendant.

Link 710 extends forward from an up-extending arm 712 of a bellcrank 714 journalled at 716. A second arm carries a roller 718 riding a front pendant control cam 720 (also FIG. 3) on the main drive shaft 90. Bellcrank 714 is spring-biased (counter-clockwise as seen in FIG. 6) for holding the roller 718 against the cam. Cam 720 moves the link 710 rearward early in each machine cycle, holds it there until mid-cycle, and then moves it forward again. With the link 710 engaging the ear 400 of the front gear pendant 390, this action swings the pendant into engagement with the selector sectors 196 (FIG. 13) during the first half of the cycle so that the number set into the selector is transferred to the actuator, as is required in addition, subtraction, and certain other operations, and disengages the pendant from the selector at mid-cycle. The forward end of the link 710 is slotted, and guided on a pin 722 (FIG. 6) on a bellcrank 724, which is journalled at 726. Normally the pin 722 holds link 710 in engagement with ear 400, but for totaling, memory-output, clear keyboard, and backspace operations, the bellcrank 724 is rocked clockwise in FIG. 6 for lifting the link 710 and notch 708 clear of the ear 400, as is explained in the copending applications previously referred to.

VII. ACCUMULATOR

As is described more fully in the copending applications already referred to, a rear gear pendant 420 swings into engagement with drive gears 444 of an accumulator 446 (FIG. 13). The gear pendant 420 includes a train of gears 422, 424 and 426 for each sector 340 of the accumulator.

In the operation of addition, the front gear pendant 390 is swung into engagement with the selector and the rear gear pendant 420 is swung rearward for bringing the gears 424 into engagement with the drive gears 444 of the accumulator. The number is thus transferred from the selector to the accumulator, and, at the same time, from the actuator to the accumulator. This action takes place in the first half of the machine cycle. Accordingly, positive entries in the accumulator rotate the register gears 448 of the accumulator, counter-clockwise as seen in FIG. 13. A subtract operation takes place in the same way except that the drive gears 444 are shifted to a lower position so that they are engaged by the lowermost gears 426 of the rear gear pendant. A total is read out of the accumulator during the first half of a machine cycle and printed at mid-cycle for leaving the accumulator clear. A subtotal is similarly read out and printed and is then returned to the accumulator during the second half of the machine cycle. For printing out a negative number from the accumulator, in a total or subtotal operation, the drive gears 444 remain in their upper, or normal, position for engagement with the pendant gears 424. For printing out a positive value, the drive gears 444 are moved to their lower position for engagement with the lowest pendant gears 426.

VIII. MECHANISM FOR CONTROLLING ENTRIES INTO, AND READOUTS FROM, THE ACCUMULATOR

The principal mechanism for controlling the transfer of numbers into and out of the accumulator is located to the right of the accumulator and appears in FIGS. 6, 7, 8, 11, 13 and 15. Parts of it also appear in the exploded perspective of FIG. 25. The function of this mechanism is to move the rear pendant 420 into and out of engagement with the drive gears 444 of the accumulator (FIG. 13) to move the drive gears 444 to their lower position when required for negative entries and positive readouts, and to test the sign of the number in the accumulator, all in response to the actuation of other controls which simply call for addition, subtraction, total, or subtotal, and also to control the printing of symbols as will be described.

1. Swinging the rear gear pendant

The swinging of the rear gear pendant 420 is effected by a pair of box cams 436 and 438 (FIGS. 15 and 25), which are rocked down (counter-clockwise in FIG. 25) for moving the pendant rearward for engaging the drive gears 444 of the accumulator. As best shown in FIG. 25, the box cams 436, 438 are fixed to a shaft 440 controlled by a bellcrank 600. A spring 602 connected to bellcrank 600 continuously urges the shaft 440, counter-clockwise in FIG. 25, for urging the gear pendant 420 to engaged position.

Bellcrank 600 is connected at 622 to a lever 614, journalled at 618 and carrying a roller 620 arranged to ride a cam 616 on the main drive shaft 90. With the shaft 90 at its home position, cam 616 holds the box cams 436 and 438 in their upper position for holding the gear pendant 420 disengaged from the accumulator. During subtotal operations, the cam 616 permits the bellcrank 600, shaft 440 and box cams 436 and 438 to be rocked, counter-clockwise in FIG. 25, by the spring, 602, and permits the rear gear pendant to remain in engagement with the accumulator during both the first and second halves of the machine cycle.

A lever 626, also journalled at 618 alongside lever 614, is pinned at 634 to a hook member 633. This hook member carries a hook portion 640 which is biased by a spring 636 into engagement with a pin 642 on the lever 614. During subtotal operations, the hook member 633 is rocked by a pin 760 for disengaging hook portion 640 from pin 642 so that the rear gear pendant is controlled by lever 614 alone, as has been described. During addition, subtraction, and total operations, the hook portion 640 remains in its normal position in engagement with the pin 642 so that the action of spring 602 for engaging the rear pendant is restrained by both the levers 614 and 626. Lever 626 is controlled by a cam 628 on the main drive shaft 90 and the action of the two cams 616 and 628 together is to permit engagement of the rear gear pendant during only the first half of the machine cycle. Normally, a pin 608 on the bellcrank 600 (FIG. 25) is blocked, for holding the rear gear pendant 420 disengaged from the accumulator, by a hook plate 604 journalled at 605.

2. Shifting the accumulator drive gears

The shifting of the drive gears 444 is controlled by two similar blocking members 652 and 654 journalled on the total-subtotal shaft 560 (FIGS. 11 and 25). These blocking members are normally held in the position shown in FIG. 11, but when a shift of the drive gears 444 is required, one or the other of these blocking members moves rearward. Their position is then tested by a dog 658 that is journalled on a pin 659 on a lever 660. This lever is journalled on a stud 662 and its forward end (left in FIGS. 11 and 25) has a cam surface 664 arranged to be engaged at the start of each machine cycle by a roller 666 between the two actuator cams 348 and 349. Lever 660 also carries a roller 668 that is held depressed by the periphery of cam 348 until about mid-cycle. Lever 660 is biased to its lower position, and the dog 658 is biased against a pin 661 (clockwise as seen in these figures) by a spring 672 that is fastened to an ear 674 on the dog 658 and extends over the pin 659 and down to the frame of the machine. A tail portion 676 of the dog 658 lies forward of a roller 678 (FIGS. 11 and 25) on the lower end of the right-hand arm 456 of the drive gear assembly.

Promptly at the beginning of each machine cycle, the roller 666 on the cams 348 and 349 depresses the cam surface 664 on the lever 660 for lifting the dog 658 to test the positions of the blocks 652 and 654. If these blocks are in their normal, forward, positions, so that no shifting of the drive gears 444 is required, the ear 674 on the dogs 658 will simply rise to the rear of the two blocking members 652 and 654. But if either blocking member has been moved rearward, it will overlie the ear 674. Under this condition, when the lever 660 is rocked to left the dog 658, the ear 764 is blocked and the dog 658 must turn (counter-clockwise in FIGS. 11 and 25). This action swings the tail 676 rearward against the roller 678 for swinging the arm 456 counter-clockwise for lowering the drive gears 444. This swifting takes place promptly at the start of the machine cycle and is completed before cam 616 (FIG. 25) permits the pendant 420 to be engaged.

3. Interlocking the drive gears and rear pendant

An interlock action between the motions of the drive gear assembly and gear pendant 420 is provided by a curved arm 680 (FIGS. 8 and 25) fixed to box cam shaft 440 and cooperating with a pin 682 (see also FIG. 11) on the lever 660. In FIG. 8, these parts are shown in their normal position with pin 682 lying in a slot 684 provided by the hook-shaped lower end of the arm 680. The initial action is the lifting of the rear end of the lever 660 (FIG. 25), and since the lever turns about its support 662, the pin 682 swings substantially free in the slot 684. In the highest position of pin 682, it is clear of the end surface 686 of the crook portion of arm 680, so that shaft 440 and arm 680 can turn (counter-clockwise in FIG. 25) for lowering the box cams 436 and 438 and bringing the gear pendant 420 into engagement with the drive gears 444. This movement of arm 680 brings the end surface 686 under the pin 682, so that the arm 680 prevents return movement of arm 660 as long as the box cams 436 and 438 hold the gear pendant 420 in engagement with the drive gears 444. This interlock action between arm 680 and pin 682, among other things, holds lever 660 in its upper position until shaft 440 lifts the box cams 436 and 438 for disengaging the gear pendant 420. During a subtotal operation this interlock keeps the rear gear pendant 420 in engagement with the drive gears 444 until near the end of the machine cycle, even though cam 348 releases lever 660 near mid-cycle.

4. Accumulator entries

The plate 604 is biased counter-clockwise as seen in FIG. 25 by a spring 610 to the limit permitted by an add-subtract control link 612 (FIG. 6) for blocking the pin 608 (FIG. 25). A slot 690 in a hook plate 604 embraces a pin 692 carried by a lever 694 fixed to an add-substract shaft 696 to which is also fixed a lever 698. At the top of this lever is an ear 702 which is part of the symbol control mechanism (FIG. 8) as will be described. Below the shaft 696, the lever 698 has a slot 704 which embraces a pin 706 on the blocking member 652 (see also FIG. 11). For an additive entry, the plate 604 and lever 694 are rocked a few degrees (plate 604 counter-clockwise, and lever 694 clockwise in FIG. 25). This action lowers hook 606 for unblocking pin 608 (FIGS. 7 and 25). It also moves the block 652 rearward slightly (right in FIGS. 11 and 25), but not enough for intercepting ear 674 of dog 658. Consequently, for this additive operation, the drive gears 444 will be left in their upper, normal position, and since nothing has disengaged the hook 633 from the pin 642, the machine will perform an addition operation as previously described.

For a substractive operation the plate 604 and lever 694 rock through substantially twice the angle as for an additive operation. This action produces a greater rearward movement of block 652 for bringing it into blocking position for intercepting the dog 658 (FIG. 11) and causing the drive gears 444 to be shifted to their lower position for the negative entry.

The add-substract control shaft 696 (FIGS. 7 and 25) extends through to the left side of the machine for actuation by the multiplication control, as is more fully described in the copending applications previously referred to.

5. Total and subtotal

The main total-subtotal shaft 560 (FLG. 25) also extends to the left side of the machine (FIG. 35) for actuation by the multiplication controls. At the right end, the shaft 560 carries a bellcrank 752 (see also FIG. 6) through which it is actuated by the total (T) and subtotal (S) keys 30 and 32 (FIG. 1), as is more fully described in the copending applications previously referred to. The shaft 560 is rotated, counter-clockwise in FIG. 25, a few degrees for causing a total operation of the machine, and is rotated in the same direction through substantially twice that angle for causing a subtotal operation. Shaft 560 carries a control lever 758 (FIG. 25) which carries the pin 760. As previously described, in a subtotal operation, the pin 760 rocks the hook lever 633. The pin 760 also lies in a slot 762 in the hook plate 604 (FIG. 25) and, in both total and subtotal operations, operates against the cam edge 763 for rotating plate 604 to the same position that it occupies for additive operations.

In a subtotal or total operation, the position of the drive gears 444 must correspond to the sign of the number that is being withdrawn from the accumulator, and that sign is indicated by an indicator 536 (FIG. 9) of a well-known type which stands in the position in which it was set by the most recent fugitive-one transfer. If the number in the accumulator is negative, the up-extending arm 540 of the indicator 536 stands directly under an ear 768 on the rear end of a bail arm 770 of a bail 772 journalled on a shaft 774 (see also FIG. 8). Bail arm 770 carries a pin 777 which lies in a slot 775 of blocking member 654 (see also FIG. 11). Also journalled on the shaft 774 is a lever 776 (FIGS. 8 and 9) having a notch that embraces a pin 778 on the total-subtotal control lever 758 (FIG. 25). A spring 780 connected between the pin 778 and a pin 782 on the bail arm 771 of bail 772 biases the bail 772 (clockwise as seen in FIGS. 8 and 9) and normally holds the pin 782 against the lever 776, as seen, for example, in FIG. 8. When the lever 758 (FIG. 25) is rocked counterclockwise in either a total or subtotal operation, the engagement of the pin 778 in the notch of the lever 776 causes that lever to turn (clockwise in FIG. 8). The lever 771, being urged by spring 780, tends to follow this movement, but if the number in the accumulator is negative, the ear 768 (FIG. 9) immediately abuts the upper end of the arm 540 of the sign indicator. The bail 772 then is unable to follow the motion (clockwise in these figures) of the lever 776 and so does not transmit any motion to the blocking member 654. Consequently, the block 654 (FIGS. 11 and 25) remains clear of the dog 658 and the drive gears 444 are left in their upper position which is correct for reading out the negative number.

However, if there is a positive number in the accumulator, the arm 540 of indicator 536 (FIG. 9) will stand clear (to the left in FIG. 9) of the ear 768 of the bail 772. Accordingly, this bail, urged by spring 780, will follow the motion of lever 776 (see FIG. 8). This action swings blocking member 654 toward the rear and puts it in position to block the ear 674 of the dog 658. Consequently, as the arm 660 rises, dog 658 rotates about its support 659 and drives the roller 678 rearward for shifting the drive gear 444 to their lower position for the readout of a positive number.

IX. RIGHT SIDE CONTROL KEYS

Figure 1:
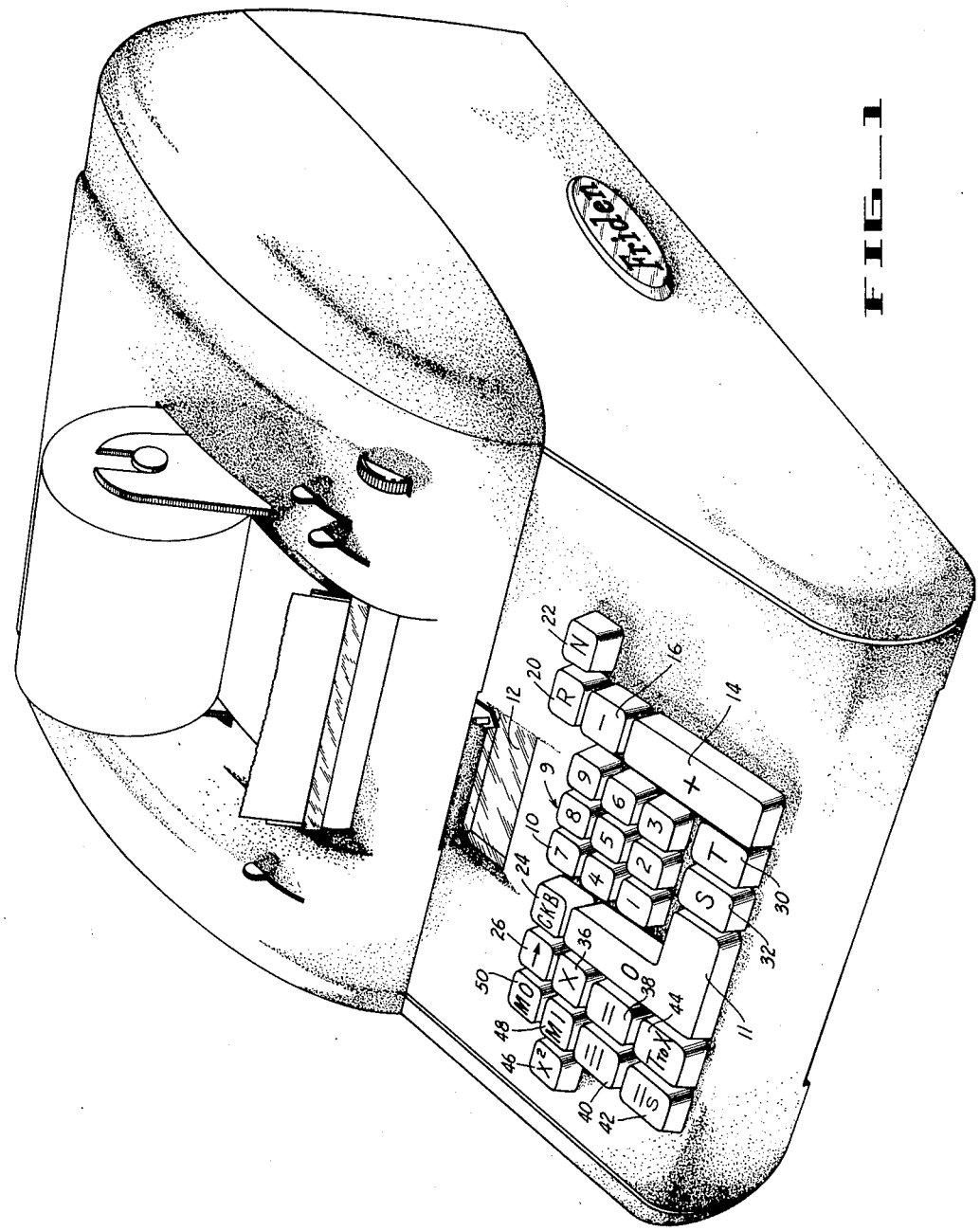
FIG. 1 is an external, perspective view of a machine, complete with case, embodying our present invention, taken from the upper right front.

The simplest machine operation is print-only (N) initiated by key 22 (FIGS. 1 and 5). The stem of this key carries a pin 810 lying above an inclined cam surface 812 on the main clutch control bar 138. When key 22 is depressed, pin 810, acting against cam surface 812, forces the bar 138 forward for releasing the main clutch for operating the machine through a single cycle, as is described in the copending applications previously referred to. Since the ear 400 (FIG. 6) of the front gear pendant is normally engaged by the link 710, the operation of the machine, through one cycle, causes the cam 720, through the bellcrank 714 and link 710, to engage the pendant with the selector so that the number in the selector is transferred to the actuator for printing, and then cleared from the machine.

The addition key 14 (FIG. 7) has a stem 814 carrying a pin 816 which overlies a tongue 818 on a lever 820 fixed to the clutch control shaft 186. Accordingly, depression of the addition key 14 rotates the shaft 186 (counterclockwise in this figure) and, through the arm 140 (FIG. 5), drives the clutch control bar 138 forward for initiating a single machine cycle. Again, because the link 710 (FIG. 6) normally engages the ear 400 of the front gear pendant 390, this action causes the number in the selector to be transferred to the actuator for printing. The pin 816 (FIG. 7) on the added key stem also carries a roller 817 which overlies a cam surface 824 (FIG. 6) on the forward end of the add-subtract link 612. The depression of the add key thus moves link 612 forward and rocks hook plate 604 (FIGS. 7 and 25) the single unit of distance required for putting the machine into an addition operation, as has been described. Consequently, the number in the selector is transferred by the actuator to the accumulator simultaneously with its receipt from the selector.

The subtraction key 16 (FIG. 6) has a stem 832 carrying a pin 834 overlying a cam edge 836 on the add-subtract bar 612. Depression of the subtraction key 16 causes the pin 834 to act against the cam edge 836 for driving the link 612 forward the two units of distance required, rocking the plate 604 (FIG. 25) enough to put the rear pendant control mechanism into subtract operation. Key stem 832 (FIG. 6) also carries a pin 838 which lies in a notch 840 of a rearward-extending arm 842 of a bellcrank 844 which carries a pin 848 at the lower end of down-extending arm 846. As shown in FIG. 7 this pin 848 lies to the rear of a tongue 852 of a lever 850 fixed to the clutch control shaft 186. Consequently, depression of the key 16, through the bellcrank 844 and lever 850, rocks the clutch control shaft 186 (counterclockwise as seen in these figures) and through lever 140 (FIG. 5) moves the clutch bar 138 forward for initiating a single machine cycle for entering the number from the selector subtractively into the accumulator.

It is to be noted that no interlocks are required or provided between any of the keys 22, 14 and 16, whose actions have just been described. The addition key 14 sets up the same controls as does the print-only key 22 and, in addition, moves the link 612. Depression of these two keys 22 and 14 simultaneously results in an addition operation. Depression simultaneously of the print-only and subtraction keys 22 and 16 similarly results in a subtraction operation. The subtraction and addition operations differ in the distance that the link 612 is moved forward, so that simultaneous depression of the two keys 14 and 16 results in a subtraction operation.

For the action of the total, subtotal and repeat keys 30, 32 and 20, reference is made to the copending applications previously identified.

X. SYMBOLS FOR RIGHT SIDE OPERATIONS

The symbols for the operation controlled by the addition, subtraction, repeat, print-only, total and subtotal keys 14, 16, 20, 22, 30 and 32 (FIG. 1) are provided on a separate print wheel 1698 (FIG. 12) and controlled by a separate actuator sector in a well-known manner. A bail arm 1700 (FIG. 11) is provided with a series of steps 1701 for stopping the symbol actuator sector at various positions. The arm 1700 is part of a bail 1703 journalled at 1702. A second arm 1704 of this bail appears in FIG. 8. For rocking this bail during each machine cycle, a link 1705 is pinned at 1706 to the actuator gear sector 360 (FIG. 11). The other end of the link has a slot 1707 embracing a pin 1708 on the bail arm 1704. A spring 1709 urges the pin 1708 toward the forward end of the slot. Thus during the first half of each machine cycle, as the actuator gear sector 360 is rocked (counter-clockwise in FIG. 11), the link 1705 (FIG. 8) is pulled forward, and the spring 1709 pulls the pin 1708 with it for rocking the bail 1703. Stops are provided for stopping the motion of this bail 1703 in various positions for controlling the printing of the different symbols by the positioning of the shoulders 1701 (FIG. 11).

The add-subtract control lever 698 (FIG. 8) is provided at its upper end with the ear 702 which lies close under the lower edge of the bail arm 1704. In the home position of lever 698, the ear 702 blocks the motion of the bail 1704 for printing a symbol "N," for indicating a print-only operation. It will be recalled that the machine is normally set for a print-only operation which can be initiated simply by engaging the power drive clutch.

It will be recalled that the addition key 14 (FIG. 1), in addition to engaging the clutch, also rocks the lever 604 (FIG. 7). The rocking of lever 604 also rocks the lever 694 (FIG. 25) which is fixed to the plus-minus shaft 696, to which the lever 698 (FIG. 8) is also fixed. This rocking of the lever 698 for an addition operation aligns the ear 702 (FIG. 8) with a slot 1715 of the bail arm 1704. This is a deep slot and it permits the bail 1703 the maximum swing for printing a plus sign. For a subtraction operation, the control lever 604 (FIG. 7) and with it, the lever 698 (FIG. 25), is rocked through a greater angle. This action brings the ear 702 (FIG. 8) under an ear 1716 of the bail arm 1704 for stopping the arm 1704 in still a different position for printing a subtraction symbol.

It will be recalled that shaft 560 rocks one amount (counter-clockwise in FIGS. 8 and 25) for a total operation, and approximately twice that for a subtotal. This action rocks the control lever 758. A pin 760 carried by the lever 758 (FIG. 25) acts on a cam edge 763 of the lever 604 for rocking that lever and also lever 694 to the same position it occupies during an addition operation. Thus during a total or subtotal operation, the ear 702 (FIG. 8) is aligned with the deep slot 1715 of the bail arm 1704. The position of the arm 1704, during total and subtotal operations, is controlled by an ear 1717 on the arm 1704, which abuts shoulders on the two lever arms 771 and 776 (see also FIG. 9). When lever 758 (FIG. 8) is rocked, its pin 778 also rocks lever 776 (clockwise in FIG. 8) and bail arm 771 (see also FIG. 9) is urged by spring 780 to follow. If the number in the accumulator is positive, the credit balance indicator 536 will not be aligned with the ear 768 on the bail 772 and consequently that bail will be free to move under the force of its spring 780 for following the movement of the lever 776. Under this condition the smaller swing of the lever 776, in response to a total operation, will swing the end abutment 1718 on the lever 771, and also the abutment 1719 on the lever 776, into alignment with the ear 1717, but the abutment 1718 will control the operation for printing the symbol "T" for a positive total. Similarly, the greater angular motion of the levers 758, 776 and 771 for a subtotal operation will align the shoulder 1720 on the lever 771, and the shoulder 1721 on the lever 776, with the ear 1717, but the shoulder 1720 will control the operation for printing a positive subtotal symbol "S."

If the number in the accumulator is negative, the credit balance indicator 536 (FIG. 15) will block the motion of ear 768 and prevent the lever 771 from moving substantially out of its home position. This action will hold the abutment 1718 and the shoulder 1720 clear of the ear 1717 so that the abutments 1719 and 1721 will control, for printing the symbols "T̄" and "S̄" for negative totals and negative subtotals, respectively.

XI. MULTIPLIER-STORAGE, OR MEMORY, UNIT

The multiplier-storage, or memory, unit includes seventeen identical differentially-settable storage sectors 970 (FIGS. 13, 15 and 26) mounted for free rotation on a common shaft 972 supported in the frame of the machine. In FIG. 13, these sectors are shown in their "0" position. Numbers are transferred to these sectors from the actuator sectors 340 by means of actuator pawls 974 pinned at 975 to the actuator sectors. Each pawl has a pair of gear teeth 976 arranged to be lifted into engagement with gear teeth 977 in the lower edge of its storage sector 970.

As shown in FIG. 26, each sector 970 of the memory or multiplier-storage unit is provided with a detent 1055 journalled on a shaft 1056 and rocked by a spring 1057 (counter-clockwise in FIG. 26) for urging the corner of an ear 1058 at its forward end into engagement with the notched edge 1059 of an arcuate slot in the storage sector 970. Thus the ear 1058, by resting in a notch of the edge 1059, tends to hold the sector 970 in any digit position into which it is set. When the sector 970 is rotated by the pawl 974, as for example, in the entry and readout of numbers, the detent 1055 is simply rocked by the inclined edges of the notches.

It is desirable, during multiplication operations, to positively lock the sectors 970 for preventing any accidental shifting thereof. Accordingly, a bail 1063 is provided for blocking the detents 1055. Normally, this bail occupies the position shown in full lines in FIGS. 13 and 26. During a multiplication operation, it is moved to the dotted position 1063–a in FIG. 26, where it underlies projection 1054 of every detent lever 1055 and prevents each lever from swinging far enough (clockwise in FIG. 26) to let the ear 1058 clear the projections between the notches of the edge 1059.

As is shown best in FIG. 10, the left leg of bail 1063 carries a pin 1064 that lies in a cam slot 1065 of a bail 1060, which is journalled at 1061 and has a slot 1062 in a depending arm embracing a pin 1049 on a multiplication bar 1050 (FIG. 35). As will be described, bar 1050 is moved forward by the multiplication key 38 and rocks bail 1060 (clockwise in FIG. 10) for camming bail 1063 (also clockwise) into the position 1063–a in FIG. 26.

1. Over-capacity test

The detents 1055 are also employed in a test for determining whether the number of digits in the multiplier and multiplicand together is within the capacity of the machine. For this purpose the rear ends 1067 of the detent levers 1055 cooperate with a plate 1066 shown, for example, in FIGS. 13, 14 and 10. The plate 1066 slides along a bail 1068 under control of the selector unit. Bail 1068 is journalled at 1077 and carries an arm 1078 that underlies a pin 1079 on the bail 1060 (FIGS. 26 and 10). When the multiplication bar 1050 (FIG. 35) is moved forward at the start of the multiplication operation, the bail 1068 rocks forward for swinging the plate into the position 1066–a shown in dotted lines in FIG. 26. If it abuts even one of the lever ends 1067, its forward motion is blocked. As will be explained in connection with FIG. 35, this blocking of slide 1066 causes the machine to execute a print-only operation instead of multiplication.

The condition that plate 1066 tests for is the position in the memory unit of the highest non-zero order of the number stored therein. To distinguish between zero and non-zero, the notch that the ear 1058 lies in when the sector 970 contains a "0," that is, the extreme forward notch is sufficiently deep that under this condition the lever end 1067 lies above and clear of the position 1066–a, as shown in FIG. 26. The other notches in the edge 1059 are shallower, so that when the sector contains any digit from "1" to "9," the ear 1058 lies higher, and the lever end 1067 lies low enough to block forward motion of the plate 1066, as in FIG. 27.

As may be seen in FIG. 14, the position of the plate 1066 on the bail 1068 is controlled by a bellcrank 1069 which is connected with the selector carriage, as previously described in connection with FIG. 24.

As the selector unit moves left one order at a time during the entry of the number, the rack 232, which is connected to the frame member 179 of the selector unit, moves left, and through the gears 234 and 236, drives the bar 242 forward for rotating the gears 246 and 250 (counter-clockwise as seen in FIG. 24). This motion swings the bellcrank 1074 (clockwise in FIG. 24) and the bellcrank 1069 (counter-clockwise in FIG. 14) for moving the plate 1066 toward the right of the machine (left in the rear view of FIG. 14). Thus, the plate 1066 is connected to, and moves with, the selector unit, but moves right when the selector unit moves left.

When the selector unit is in home position, the plate 1066 lies in the position shown in FIG. 14, that is, just clear of the leftmost (rightmost in FIG. 14), or highest-order, lever-end 1067. When a digit is placed in the first order of the selector unit, by depression of one of the keys 9 (FIG. 1), the selector unit is moved one order to the left, and this action, through the mechanism just described, moves the plate 1066 one order to the right (left in FIG. 14) to bring the plate under the lever end 1067 of the highest order of the memory unit. As digits are entered in additional orders of the selector unit and the unit is indexed to the left, the plate 1066 is stepped to the right with it, order-for-order. Thus the number of orders filled in the selector unit, plus the number of orders that are not blocked by the plate 1066, is constant at seventeen, which is equal to the number of orders in each of the multiplier-storage unit and the accumulator.

Although the multiplier-storage unit has seventeen orders, the multiplier must be limited to sixteen orders because the machine here shown and described employs short-cut multiplication. One order must be left available for a carryout of the highest order of the number. With this maximum of a sixteen-order multiplier, the multiplicant is permitted only one order. Taking this situation as an example, with one order in the selector occupied, the plate 1066 (FIG. 14) will be aligned with only the highest order (rightmost in FIG. 14) of the memory unit. As is shown in FIG. 26, this condition requires that this highest order contain a "0," but the other sixteen orders wil be untested and can contain anything.

As is well known, the number of digits in the product may be as great as the sum of the digits in the multiplier and the multiplicand. For example, the product of "9" and "9" is "81," the product of "9" and "99" is "891" and the product of "99" and "99" is "9801." Thus the over-capacity test provided by the plate 1066 and the lever ends 1067 ensures that the product will not exceed the seventeen orders of the accumulator.

2. Operation of actuator pawls 974

The rear ends of the pawls 974 (FIGS. 13 and 26) are supported and guided in slots 978 in plates which are raised and lowered for controlling the engagement and disengagement of the pawls with the teeth 977 of the sectors 970. During each operating cycle of the machine the pawls 974 are moved by the actuator segment 340, rearward during the first half of the cycle and forward during the second half.

The plates that contain the slots 978 are assembled in a basket-like structure 980 (FIGS. 13 and 15) which includes similar end brackets 981 and 982, each of which has a slot 983 at its upper end, embracing a hub on the shaft 972. The lower portions of these end plates carry trunnion rollers 985 and 986 which lie in slots 987 in the frame of the machine. The basket 980 is thus guided by the slots 983 embracing the shaft 972 and the slots 987 embracing the rollers 985 and 986. The motion of the basket is controlled by a pair of cam follower arms 991 and 992 (FIGS. 11 and 17) having slots 993 also embracing the trunnion rollers 985 and 986. These followers carry rollers 994 which ride on right and left basket control arms 995 and 996 on the rear drive shaft 110. Springs 997 normally urge the follower arms 991 and 992 (clockwise in FIG. 11) for lifting the basket 980 and thereby engaging the actuator pawls 974 with the sectors 970. The cams 995 and 996 each have two high portions 998 and 99 which drive the basket to its lower poistion at the full-cycle and mid-cycle positions, respectively.

The follower bellcranks 991 and 992 are also controlled by latches 1003 and 1004 (FIGS. 11 and 17) which are fixed to the same shaft 1005 so that they operate in unison, and are normally held in the position shown by a spring 1006 which acts on a lever 1009 to urge it counter-clockwise (as viewed in FIG. 17). Lever 1009 carries a pin 1010 (see FIG. 18) which is connected by a light spring 1011 to a pin on latch lever 1004 for normally holding the latch lever against pin 1010 but at times permitting the lever 1009 to be swung rearward without the latch 1004. Normally the spring 1006 urges the pin 1010 forward against the rear edge of latch lever 1004 for holding this latch, and also the similar latch 1003 (FIG. 11) forward in the positions shown so that their shoulders 1015 overlie ears 1016 on the bellcranks 991 and 992 for latching the basket 980 in its lower position.

Lever 1009 (FIGS. 17 and 18) carries a pin 1018 which normally lies just behind the rear edge 1019 of a memory control link 1020. During a memory output operation, the link 1020 is moved rearward, and through pin 1018, disengages the latches 1003 and 1004 from the bellcranks 991 and 992, permitting the basket to rise under control of the cams 995 and 996.

Latches 1003 and 1004 also have shoulders 1097 which, when the latches are moved rearward, can underlie the ears 1016 for latching the basket 980 up. Since the cams 995 and 996 drive the basket down, these shoulders 1097 cannot be left in latching position when the cam lobes 998 come under rollers 994. Therefore, pins 1095 and 1145 (FIG. 17) are provided on cam 996 for striking the tail 1096 of the latch lever 1004 for swinging shoulders 1097 clear of the ears 1016 just before the cams pull the basket down.

In FIG. 11, a bellcrank 1021, journalled on a pin 1022, is rocked (counter-clockwise in this figure) just before the end of each machine cycle, by a pin 1023 on cam 995. As the cam so rocks, its forward end 1033 drives against an ear 1034 on the latch lever 1003, for ensuring that the latches 1003 and 1004 are firmly in the home positions.

3. Memory clearing bail

The memory register is provided with a clearing bail 1025 (FIGS. 13 and 15) supported on bail arms 1026 fixed to the shaft 972. This bail normally lies in the position shown in these figures, and is swung rearward (counter-clockwise in FIG. 13) for rotating all of the memory storage sectors 970 to their "0" positions, in which they are shown in FIG. 13 where they stop against a frame tie rod 971. This clearing operation is utilized for clearing one number from the memory before inserting a new one, and it is also utilized as a drive mechanism for ensuring positive operation when a number is read out of the memory unit into the actuator. For operating this clearing bail, the shaft 972 carries a lever arm 1027 (FIGS. 17 and 18) to which is connected a drive link 1028 which, at its forward end, has a curved slot 1029 embracing a roller 1030 carried by a rocking plate 1035.

A pin 1036 at the upper edge of the rocking plate 1035 (FIG. 17) lies just behind a rear facing shoulder 1037 of the memory control link 1020 so that the plate is rocked counter-clockwise in FIG. 17 when the control link 1020 is moved rearward for a memory output operation. A similar pin 1038 at the lower edge of the rock plate 1035 is rocked in the same direction (counter-clockwise in FIG. 17) by forward movement of the link 1020. Such forward movement accompanies operations for entering numbers into the memory unit, that is, operations initiated by the keys 36, 44, 46 and 48 in FIG. 1. Springs 1040 urge the pins 1036 and 1038 against their respective shoulders 1037 and 1039 for centralizing the link 1020 and for holding the rock plate 1035 in its normal position, shown in FIG. 17.

Thus, movement of the memory control link 1020, either forward or rearward out of its normal, centralized position, rocks the plate 1035 (counter-clockwise in FIG. 17). This action lifts the roller 1030 for lifting the drive link 1028 (FIG. 18). In lifted position, a curved shoulder, or seat, 1045 on the link lies behind a roller 1046 of the actuator gear segment 376. The gear segment 376 is rocked (clockwise in FIG. 18) during the first half of each machine cycle and then is returned (counter-clockwise in FIG. 18) to its home position during the second half of the machine cycle. Therefore, when the link 1028 is held in its lifted position by the roller 1030, the roller 1046, during the first half of the machine cycle, drives rearward against the seat 1045 of the link 1028, for rotating the shaft 972, and with it the reset bail 1025 (FIG. 13), for driving the memory segments to their "0" position. As the gear segment 376 rotates to its home position (counter-clockwise in FIG. 18) during the second half of the machine cycle, a spring 1047 returns the clearing bail 1025 to its normal position. The curve of slot 1029 permits link 1028 to follow the arcuate motion of roller 1046.

Drive link 1028 carries a down-extending projection 1051 (FIGS. 17 and 18) which is arranged to move rearward against the pin 1010 (FIG. 18) on the lever 1009 for operating the latch levers 1004 and 1003 (FIG. 11) during memory entry and readout operations. Another projection 1052 (FIG. 18) on the drive link 1028 controls the printing of symbols, as will be described.

XII. CONTROL OF MEMORY ENTRY AND READOUT OPERATIONS

1. *Multiplier-entry (X) key*

A number may be entered into the multiplier-storage, or memory, unit by an operation initiated by depression of the multiplier-entry (X) key 36 (FIG. 1). As is shown in FIG. 17, this key is held in its upper position by a spring 1081. The stem of this key carries a pin 1082 which lies above an inclined slot in a clutch bar 1083 carried by arms 1080 and 1084, of which arm 1084 is fixed to the shaft 186. As is shown in FIG. 5, shaft 186 at its right end carries an arm 140 connected to the clutch bar 138. Thus when the key 36 (FIG. 17) is depressed, bars 1083 and 138 are moved forward in the machine for releasing the clutch and initiating a machine cycle. The stem of key 36 also carries a pin 1085 which, as shown in FIG. 20, overlies a rearward extending arm 1086 of a bellcrank 1087 having a down-extending arm 1088 to which is pinned the memory control link 1020 by means of a pin 1089 (see also FIG. 21). Thus depression of the key 36, through bellcrank 1087 (FIG. 20), pulls the memory control link 1020 forward (see also FIG. 17).

It will be recalled that typically a number is first entered into the selector unit by means of the keys 9 (FIG. 1) and then the multiplier-entry (X) key 36 is depressed to cause that number to be transferred through the actuator into the multiplier storage, or memory, unit.

Operation of the clutch bar 138 by the key 36 sets the machine into operation and the single cycle action automatically stops the machine at the end of the first cycle. As previously described, the link 710 (FIG. 6) is normally in engagement with the ear 400 of the front gear pendant, so that, during the first half of this machine cycle, the number in the selector is transferred to the actuator.

2. *Input cycle*

Referring also to FIGS. 17 and 18, the depression of the key 36 moves the memory control link 1020 forward. As previously described, this action causes the pin 1038 to drive the rock plate 1035 (counter-clockwise in this figure) for lifting the notch 1045 (FIG. 18) of the drive link 1028 into alignment with the roller 1046 on the actuator drive gear segment so that during the first half of the machine cycle the link 1028 is driven rearward, so that the clearing bail 1025 (FIGS. 13 and 15) drives all of the memory storage sectors toward their "0" positions. At the same time, the rotation (counter-clockwise in FIG. 17) of the rear drive shaft 110 carries the lobe 998 of cam 996 away from the roller 994, and simultaneously the corresponding lobe 998 of the cam 995 moves away from roller 994 in FIG. 11. Thus, early in the cycle, the basket bellcranks 991 and 992 (FIGS. 11 and 17) are released by the cams 995 and 996, but they are stopped by the shoulders 1015 of the latch levers 1003 and 1004.

Late in the first half-cyle, while the drive link 1028 (FIG. 18) is still being driven rearward, the lower projection 1051 on the link 1028 engages pin 1010 (FIG. 17) on the lever 1009 and drives that lever rearward. As the pin 1010 moves rearward, spring 1011 tends to pull the latch levers 1004 and 1003 rearward with it but the latches are held by the friction and angle of their engagement with the ears 1015 and 1016 of the bellcranks 991 and 992. The force exerted by the springs 997 is so much greater than light spring 1011, and the angle of engagement between the shoulders 1015 of the bellcranks is such that the pressure of these bellcranks, urged by the springs 997, is sufficient to resist the force of the spring 1011 and thereby prevent the latch levers 1003 and 1004 from following the rearward motion of the lever 1009.

Also during the first half of the machine cycle, the actuator pawls 974 are moved rearward (to the right as seen in FIGS, 13 and 26), but because the bellcranks 991 and 992 have not been permitted to follow the cams 995 and 996, the basket 980 has remained in its lower position and the pawls 976 have not engaged the sectors 970. It will be recalled that each sector 340 of the actuator rotates to an angular position that depends on the digit that it receives from the selector unit, and accordingly each sector 340 moves the pawl 974 that is connected to it, rearward a distance also corresponding to that digit as, for example, to a position such as 976–b in FIG. 26.

At mid-cycle, when the pawls 974 have all completed their rearward motion, the smaller lobes 999 of cams 995 and 996 (FIGS. 11 and 17) come under rollers 994 of the basket bellcranks 991 and 992. This action lowers the ears 1016 of these bellcranks, and releases their pressure on the shoulders 1015 of the latch levers 1003 and 1004 for releasing those levers to the action of the spring 1011, which is still extended because the drive link 1028 is, at this time, at its extreme rearward position. Thus at mid-cycle, the basket control bellcranks 991 and 992 are released to the control of their cams 995 and 996. As the machine enters the second half of the cycle, rollers 994 run off the lobes of the cams, the bellcranks 991 and 992 rock (counter-clockwise as seen in FIG. 17) and permit the springs 997 to life the basket 980 so that the pawls 974 (FIG. 26) are lifted into a position, such as 976–c, for engaging the sectors 970. Thereafter, as the machine continues in the second half-cycle, the actuator bail rod 344 (FIG. 13) is swung up to its home position for driving all of the actuator sectors home. This action moves the pawls 974 forward (left in FIG. 26) for transferring the values from the actuator sectors to the multiplier-storage sectors 970, bringing the parts to a position, such as that shown in FIG. 27, with the gear portion of the pawl 976 in its extreme forward position but still in engagement with sector 970, as indicated at 976–d.

As the machine approaches the end of the cycle, the lobes 998 of the cams 995 and 996 (FIGS. 11 and 17) again come under the rollers 994 for again lowering the basket. At the same time, the roller 1095 on the cam 996 (FIG. 17) drives against the lower end 1096 of the latch lever 1004 for ensuring that this lever is swung forward so that the shoulder 1097 on this hook lever is moved forward and clear of the ear 1016 on the bellcrank 992, and for clearing a similar shoulder on the right side of the machine, as shown in FIG. 11. Accordingly, at the end of the machine cycle, the number has been transferred from the selector to the memory, or multiplier-storage, unit and the selector has been cleared.

3. *Memory input (MI) key*

The memory input key 48 (FIG. 1) is an extra-function, preparatory key, and does not operate the clutch for initiating a machine cycle. The stem of key 48 carries a pin 1109 (FIG. 21) which overlies a cam edge 1110 on the link 1020 so that depression of the key 48 moves the link 1020 forward for setting up the controls for the entry of a number into the memory unit. The stem of key 48 also carries a pin 1111 which cooperates with a hook 1112 which is part of a link 1113 that extends rearward to the lever 280 of the selector restore mechanism (FIG. 23). A pin 1114 on the lever 280 lies within a slot at the rear end of link 1113 for supporting the link and for providing a lost motion driving connection therewith. The forward end of link 1113 is supported on a link 1115 to which a spring 1116 is connected for biasing the link 1113 forward (FIG. 21). Thus, upon depression of "MI" key 48, the pin 1111 rocks the hook 1112, passes below it, and is latched in its depressed position. With the key 48 thus latched down, the machine may be put into operation, as, for example, by any of the keys 14, 16, 20, 22, 30 or 32 on the right-hand side of the machine, and the number brought into the actuator by the operation thereby initiated will also be entered into the memory unit. Near the end of the machine cycle the pin 274 (FIGS. 23 and 24) drives against the forward end 276 of the lever arm 280 for rocking that lever. This motion of lever 280 takes up the lost motion at the pin 1114 (FIG. 23) and draws the link 1113 rearward for disengaging the hook 1112 (FIG. 21) from the pin 1111 and thereby releasing the key 48 to be restored by its spring 1108. Although during a repeat operation, the hook 1112 is disengaged from the pin 1111 by the motion of the lever arm 280 during each machine cycle, the memory input key 48 will be held down by a link 1566 (FIG. 16) as will be described.

4. *Memory output (MO) key*

The memory output (MO) key 50 (FIG. 1) is also an extra function, preparatory key and does not control the clutch for initiating a machine cycle. It carries a pin 1121 (FIG. 21) at its lower end overlying a cam surface 1122 on the memory control link 1020 so that when key 50 is depressed, the link 1020 is moved rearward. The stem of key 50 also carries a pin 1123 which cooperates with the hook 1124 on the link 1113 for latching the key 50 down and releasing it at the end of the machine cycle in the same manner as the key 48 is latched and released.

Slide 1020 carries a pin 1129 (FIG. 17) lying in front of the lower end of a lever 1130 fixed to a shaft 1131. Shaft 1131 extends through the machine and at the right side (FIG. 6) carries a lever 1132. An extension 1133 of this lever lies in front of a pin 1134 on the lever 724. Rearward movement of the link 1020, through pin 1129, rocks the lever 1130 (clockwise in FIG. 17), through shaft 1131 and lever 1132 (FIG. 6) rocks the lever 724 (clockwise in FIG. 6) about its support 726, and through pin 722 lifts the link 710 clear of the ear 400 on the front gear pendant. Consequently, during a memory output operation, the front gear pendant cannot be connected to the selector unit.

Another extension 1139 of the lever 1132 (FIG. 6) has a rearward extending hook 1140 arranged to underlie an ear 1141 on the upper arm 1731 of the bellcrank 752 on the main total-subtotal control shaft 560. When the arm 1132 (FIG. 6) is swung rearward by the depression of the memory output key 50, hook 1140 swings under the ear 1141 and blocks rotation (counter-clockwise in FIG. 6) of the bellcrank 752 and thus prevents the initiation of a total or subtotal operation. The effect of preventing the engagement of the front gear pendant, or the initiation of a total or subtotal cycle, is to ensure that during the memory output operation the actuator can receive a number only from the memory unit.

Accordingly, after the memory output key 50 is depressed, the machine cyle may be initiated by any of the keys on the right-hand side of the machine, that is, keys 14, 16, 20, 22, 30 or 32. The print-only key 22, the total key 30 or the subtotal key 32 will cause the machine to read out and print the number in the memory unit and then, as will be described, return it to the memory unit. It is because the total-subtotal lever 752 (FIG. 6) is blocked by lever 1139, that the total and subtotal keys in this instance produce the same operation as the print-only key. The add key 14 or substract key 16 will produce the same operation and, in addition, will enter the number into the accumulator, additively or subtractively, respectively. Depression of the repeat key will enter the number from the memory unit into the accumulator repeatedly. During this repeat-add, memory-output operation, the "MO" key 50 is held down by a cam edge 1576 (FIG. 16) overlying the pin 1121 on the key stem of the "MO" key 50 (FIG. 21), as will be explained under "CLEAR KEYBOARD AND BACKSPACE." The foregoing memory-output operations utilizing the print-only total, subtotal, add and subtract keys, all clear the selector; the operation with the repeat key does not.

Interlocks (not shown) are provided to prevent simultaneous use of the memory output key 50 and any of the multiplier-entry and multiplication keys 36, 38, 40, 42, 44 or 46. Interlocks may also be provided between the "MO" key 50 and each of the total and subtotal keys 30 and 32 if desired. As will be described, depression of either the backspace key 26 or the clear keyboard key 24 releases the memory input and memory output keys 48 and 50.

5. *Readout cycle*

Referring back to the rearward movement of the memory control link 1020 (FIG. 17) when the "MO" key 50 is depressed, this action also drives against pin 1036 for rocking the plate 1035 (counter-clockwise in this figure) for lifting roller 1030 and thereby lifting the seat 1045 (FIG. 18) into position behind the roller 1046 on the actuator gear segment 376. The rear edge 1019 of the link 1020 also drives against pin 1018, for rocking the lever 1009 and thereby, through spring 1011, pulling the latch lever 1004 rearward, and with it the similar latch lever 1003 (FIG. 11) on the other side of the machine, for unlatching the basket control bellcranks 991 and 992. At this time, the latches 1003 and 1004 are not restrained by the bellcranks 991 and 992. Then when an operating key is depressed, such as the print-only key 22 (FIG. 1), the machine begins an operating cycle. The cams 996 and 995 (FIGS. 11 and 17) quickly run out from under the rollers 994 to permit the springs 997 to lift the basket 980 for raising the pawls 976 (see also FIG. 26) into engagement with the memory sectors 970, and spring 1011 pulls the latch levers 1004 and 1003 rearward to latch ears 1016 in their upper position. Promptly thereafter, the actuator gear segment 376 (FIG. 18) begins rotating (clockwise in this figure) for swinging the actuator bail 344 (FIG. 13) down and driving the actuator segments. At the same time roller 1046 (FIG. 18) drives rearward against the drive link 1028 for driving the clearing bail 1025 (FIG. 13) of the memory unit rearward. It is to be noted that the drive exerted by the actuator bail 344 (FIG. 13) is a yielding drive in that it drives through the spring-loaded, sickle-shaped levers 345, whereas, the clearing bail 1025 of the memory unit positively drives all the memory sectors 970 to "0" and so ensures that the number is properly transferred to the actuator unit.

At mid-cycle the cam lobes 999 must pass rollers 994 and, therefore, the hooks 1097 must release ears 1016 of bellcranks 991 and 992 (FIGS. 11 and 17). As link 1028 approaches its rear position, projection 1051 (FIG. 18) comes against pin 1010, but lever 1009 is already held in its extreme rear position by link 1020 against pin 1018. Accordingly, as the machine approaches mid-cycle, the roller 1145 on the cam 996 (FIG. 17) strikes the tail 1096 of the lever 1004 for disengaging the latch shoulder 1097 from the ear 1016 of the bellcrank 992, and similarly disengages the latch lever 1003 from the bellcrank 991 of FIG. 11. Then as the lobes 999 pass the rollers 994, the basket is lowered for disengaging the pawls 997 (FIG. 27) from the storage sectors 970, and immediately raised for re-engaging them. During this temporary disengagement, the memory sectors 970 are held in their "0" positions by the clearing bail 1025, and the actuator sectors 340 are held by detents 466 (FIG. 13). At this mid-cycle, the number thus brought into the accumulator from the memory storage unit is printed in a well-known manner. As the machine goes into the second half of the cycle, the basket 980 is in its upper position so that the pawls 976 are in engagement with the memory sectors 970 for connecting them to the actuator. During this second half-cycle, the actuator bail 344 moves up to its home position and positively drives all of the actuator sectors to their "0" positions, and in so doing transfers the number back to the sectors 970 of the memory unit. As the machine approaches its full-cycle position, the pin 1095 (FIG. 17) on cam 996 strikes the tail 1096 of the latch lever 1004 for unhooking the basket bellcranks 991 and 992, as previously described. The basket is then lowered by the cams 995 and 996 as they come to their home position. Also near the end of the cycle the roller 274 (FIGS. 23 and 24) on cam 270 strikes the end 276 of lever 280 for rocking it and moving the link 1113 rearward, as previously described in connection with the operation of the memory input key 48. This rearward motion of link 1113 disengages hook 1124 (FIG. 21) from the pin 1123, permitting the memory output key 50 to rise to its normal position. The machine will stop under control of the operating key that initiated the operation.

XIII. CLEAR KEYBOARD AND BACKSPACE

The clear keyboard operation initiated by key 24 cycles the machine for clearing the selector. It is essentially a print-only operation with printing suppressed by means of a lever 1565 (FIG. 22) that blocks pin 1660 of print control lever 1662 (FIG. 20) as is explained in the the copending applications previously referred to.

Special interlocks are provided to prevent a clear keyboard or a backspace operation from being attempted at the same time as a memory input or memory output option. In FIG. 16 an interlock lever 1566 is journalled at 1567 on the stem 1568 of the clear keyboard key 24 (see also FIG. 1) and is biased rearward by a spring 1569 against a shouldered stop-and-guide pin 1570. A pin 1571 on the clutch control bar 1083 is aligned with a shoulder 1572 on the lever 1566 for driving the lever forward (counter-clockwise in FIG. 16) when the clutch is operated for cycling the machine. However, if the clear keyboard key 24 is depressed, the shoulder 1572 is lowered and left clear of the pin 1571. The lower end of lever 1566 is provided with slots 1573 and 1574 co-operating with the pins 1109 and 1121 on the memory input and memory output keys, respectively. With the clear keyboard key 24 in its upper position, and the lever 1566 swung forward by pin 1571, the pins 1109 and 1121 on the memory input and memory output keys are embraced by the slots 1573 and 1574, or one or the other is forced to its fully depressed position by a cam face 1575 or 1576. (The two pins 1109 and 1121 cannot be depressed simultaneously because they act in opposite directions on the cam faces 1110 and 1112 of the memory control link 1020, FIG. 21.) Thus, for example, if the memory input key 48 is only partially depressed at the same time as an operating key, such as the addition key 14, is depressed, the movement of the clutch bar 1083, through pin 1571 and lever 1566, will force the memory input key to its fully depressed position for proper operation. When the clear keyboard key 24 is depressed, the lever 1566 moves down with it, staying clear of the pins 1109 and 1121. The clear keyboard key stem 1568 also carries a pin 1580 (FIG. 15) which, as shown in FIG. 21, overlies a cam edge 1581 of the link 1113 which carries the two hooks 1112 and 1124 that latch down the keys 48 and 50. Consequently, the depression of the clear keyboard key 24 releases the memory input and memory output keys to prevent any inadvertent memory transfer operation at the same time. The clear keyboard key stem 1568 also carries a pin 1582 which cooperates with the clutch bar 1083 (FIG. 16) so that the key 24 actuates the clutch bar and the clutch bar locks the key 24 down.

An interlock is provided to prevent the clear keyboard key 24 from being depressed simultaneously with any of the right side control keys 14, 16, 20, 22, 30 or 32, or with any of the multiplication keys 36, 38, 40, 42, 44 or 48. This interlock is of a known type and includes a bar, not shown, but similar to, and lying parallel to the clutch bar 1083 (FIG. 16) which is similarly moved by the pin 1582 on the key stem 1568 when the clear keyboard key is depressed. This same interlock bar is blocked by an ear 1583 (FIG. 15) on the bellcrank 326 whenever the selector unit is in home position, as is explained more fully in the copending applications previously referred to.

The backspace key 26 has a key stem 1585 (FIG. 17) with a shoulder 1586 that overlies the pin 1567 of the clear keyboard key (FIG. 16) so that depression of the backspace key depresses also the clear keyboard key. The backspacing key stem 1585 also has a pin 1587 (FIG. 17) that cooperates with an inclined slot in the clutch bar 1083 so that the clutch bar locks the backspacing key 26 down. Another pin 1588 (FIG. 17) on the backspacing key stem 1585 overlies an arm 948 of a bail 950, which is rocked (clockwise in FIG. 17) for setting the machine for the backspacing action, as described in the copending applications previously referred to. Thus, depression of backspace key 26 also releases the preparatory "MI" and "MO" keys 48 and 50 for preventing the entry or printing of a number being corrected.

XIV. MULTIPLICATION CONTROL

The present machine includes mechanism carried on the sensor carriage 1194 (FIGS. 15 and 24) for sensing the digits stored in the sectors 970 of the memory storage unit, and includes also mechanisms for controlling the multiplication operation according to a "short-cut" plan, which mechanisms are shown and described in greater detail in the copending applications previously referred to.

The multiplication (=) key 38 (FIG. 1), by which a multiplication operation is initiated, has a stem 1401 (see FIGS. 17, 19 and 35) which carries a spring-loaded overload cam 1402. This cam engages a pin 1410 on a lever 1404 journalled at 1403, and pinned to the forward end of the multiplier bar 1050. The initial slight depression of the key 38, through the cam 1402, rocks the lever 1404 against a light spring 1405, and draws the bar 1050 forward slightly. This slight forward motion, through pin 1049 (FIG. 10), rocks the bail 1060, which, in turn, rocks the bail 1068 for making the over-capacity test previously described in connection with FIGS. 13 and 26. If there are too many orders in the multiplier and multiplicand, slide 1066 (FIGS. 13 and 14) will be stopped by a lever end 1067 and will block the forward motion of the equals (=) bar 1050 (FIG. 35) before any other control actions are performed. Accordingly, with bar 1050 blocked, overload cam 1402 (FIG. 35) is rocked, and key 38 is depressed without initiating the multiplication operation. Depression of key 38, through pin 1430 (FIG. 17), actuates the clutch bar 1083, which is connected through link 1084 and clutch shaft 186 to clutch bar 138 (FIG. 5), and a machine cycle is started. As was described in connection with the print-only key 22, the actuation of only the clutch control causes a print-only operation which clears the selector unit. The clearing of the multiplicand from the selector unit reduces and eliminates the over-capacity condition.

Returning to FIG. 35, if bar 1050 is not blocked by the over-capacity test, movement of lever 1404 continues. Also journalled on the pin 1403 is a depending hook 1406 which has a lost motion connection at 1407 with the lever 1404. A light spring 1414 holds hook 1406 in engagement with a pin 1411 on a lever 1408 during the over-capacity test. The initial motion of lever 1404 beyond the over-capacity test, swings this hook for releasing the lever 1408, which is loaded by a heavy spring 1409. Upon this release, the spring 1409 rocks the lever 1408 clockwise in this figure and pulls the equals bar 1050 forward for initiating the multiplication operation. This action of spring 1409, through lever 1404 and pin 1410, drives the key 38 to its fully depressed condition. This action of key 38, through the pin 1430, drives the clutch bar 1083 (FIG. 17) forward. Also, a pin 1412 on the lever 1408 depresses tongue 1413 of lever 944 (FIG. 17) for setting the machine for repeat operation, as described in the applications previously referred to.

The full forward motion of bar 1050 (FIG. 35) also causes pin 1049 to rock the bail 1060 (FIG. 10), which, in turn, rocks the bail 1063 to its rear position 1063–a (FIG. 26) for blocking the detent levers 1055 and preventing any changes in the settings of the storage sectors 970 during multiplication, as was described.

Figures 28, 29, 30:
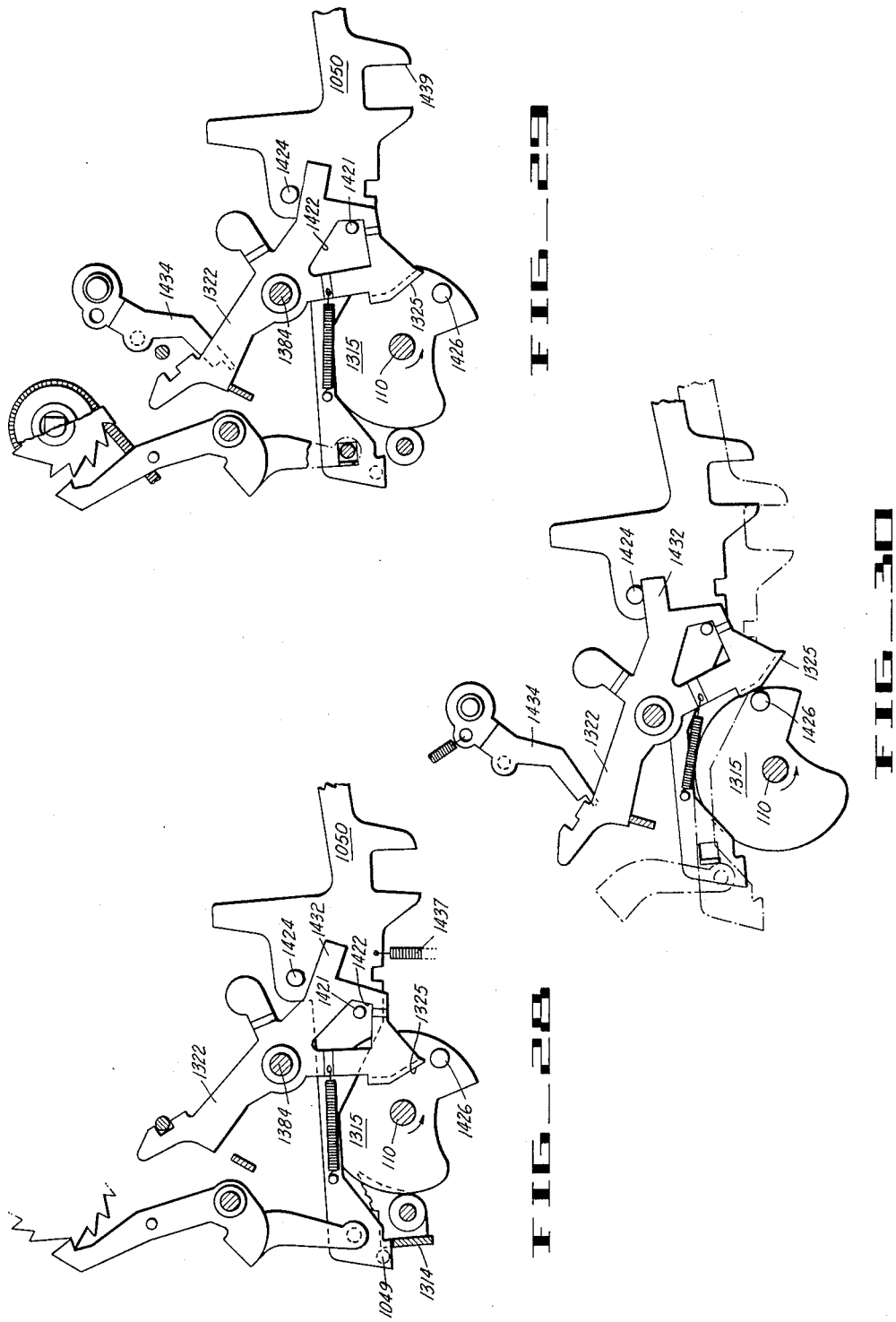

The spring-driven forward motion of the equals bar 1050 also drives a pin 1421 (FIG. 28) against an edge 1422 of the main multiplication lever 1322 for rocking it from its normal position shown in FIG. 28 to that shown in FIG. 29. The action brings a cam face 1325 at the lower edge of the lever 1322 into the path of a pin 1426 on the cam 1315.

The actions of key 38, bar 1050, and lever 1322, just described, take place substantially before the machine begins operating. Early in the first cycle, the pin 1426 (FIG. 29) drives against the cam surface 1325 and rocks the lever 1322 to the position shown in FIG. 30. This action causes the tail 1432 of the lever 1322 to lift the pin 1424 for raising the bar 1050. A spring-urged latch 1434 (FIG. 30) engages the lever 1322 for holding it in this operative position and will continue to hold it there until released by a successful termination test for ending the multiplication operation. The equals bar 1050 (FIGS. 29 and 22) includes a notch 1439 which embraces the ear 1269 of the lever 1267 (FIG. 21) which controls the clutch for connecting the two carriages during the multiplication operation, as previously described (FIGS. 24 and 36). This operation of bar 1050 and lever 1322 (FIG. 29) also makes other initial settings for automatic multiplication as described in the copending applications previously referred to.

At about mid-cycle of the last cycle of the automatic multiplication operation, the latch 1434 (FIG. 30) releases the multiplication control lever 1322 (FIG. 31). This action causes the bar 1050 to drop, urged by a spring 1437, below its normal position of FIG. 28. As shown in FIG. 32, this action is timed to occur when a bail 1314 controlled by the cam 1315, is forward so that a shoulder 1436 at the rear end of bar 1050 drops behind the bail 1314. At the same time, a notch 1438 in the bar 1050 drops over an ear 1440 (FIG. 32) at the upper end of a lever 1441 journalled at its lower end at 1442. This lever is connected by a movable pin 1443 to a lever 1444 fixed to the shaft 560 which extends through the machine for controlling the total and sub-total operations (for example, FIG. 8), as previously described. With the parts thus in the position shown in FIG. 32 (during the last portion of the last cycle in the multiplication operation, as described in the applications referred to) the cam 1315 drives the bail 1314 rearward for thereby driving the bar 1050 rearward and leaving it in an overstroke position shown in FIG. 33, behind and below its home position. With the pin 1443 in its lower position, as shown in FIG. 33, the rocking of lever 1441, by the rearward movement of bar 1050, has set the accumulator for a total-taking operation. If the pin 1443 had been in its upper position shown in FIG. 34, the rocking of the lever 1441 would have produced a greater angular movement of the lever 1444 for causing the last operation to be a subtotal operation. Pin 1443 is moved by the depression of the accumulate multiplication key 42 (FIG. 1). Restoration of the link 1050 also, through lever 1267 (FIG. 21), disengages the carriage clutch 1264, 1265 (FIG. 36).

The rearward motion of bar 1050 to the overstroke position forces the levers 1404 and 1408 (FIG. 35) past their normal positions so that the hook 1406 easily engages under the pin 1411. Because the key 38 is still held down by the clutch bar 1083, this return of lever 1404 causes a rocking of overload cam 1402. The restoration of the lever 1408 also, through pin 1412, lever 944 (FIG. 35) and shaft 936, restores the repeat control to normal. This restoration of the single cycle action comes too late to terminate the machine operation in this, the last cycle of the multiplication, but it will cause termination at the end of the next, the total-taking cycle.

The machine now goes into a total-taking cycle for reading the total out of the accumulator and printing it, returning the selector to home and clearing it (FIG. 24), and also returning the multiplier sensor carriage 1194 to its extreme right-hand, or home position. Near the end of the total-taking cycle, roller 1426 (FIG. 33) on the cam 1315 runs under the edge 1448 of the bar 1050 and lifts it so that the shoulder 1436 rises above the bail 1314 and the bar moves forward slightly under the force of the spring 1409 (FIG. 35) into its home position.

XV. NEGATIVE MULTIPLICATION AND ACCUMULATIVE MULTIPLICATION

The negative multiplication, or "negative equals" (— =) key 40 (FIG. 1) has a key stem 1501 (FIG. 21) which carries a pin 1502 which overlies a bar 1503 on the stem of the multiplication, or equals (=) key 38 (FIG. 17). Consequently, depression of key 40 depresses also the multiplication key 38 for causing the complete multiplication operation, as just described. However, key stem 1501 also has a pin 1505 (FIG. 21) which lies in the slot 1506 (FIG. 23) of a bellcrank 1507 journalled at 1508. At its upper end the bellcrank 1507 is pinned at 1509 to a negative multiplication link 1510, so that depression of the negative equals key 40 moves the link 1387 forward. As is explained in the applications previously referred to, movement of the link 1387 to its forward position modifies the multiplication operation by causing the product to be entered in the accumulator subtractively.

The accumulative equals (= S) key 42 (FIG. 1) has a stem 1516 (FIG. 21) which carries a pin 1517, similarly overlying the bar 1503 (FIG. 17) on the equals key 38 so that the depression of the key 32 puts the machine into a multiplication program. Key stem 1516 (FIG. 21) also has a pin 1518 which engages a slot 1519 (FIG. 22) in a bellcrank 1520 journalled at 1521. A link 1523 connects this bellcrank with a bellcrank 1524 journalled at 1525 at the rear of the machine. This bellcrank is connected to a link 1526, the upper end of which carries the pin 1443 connecting the two levers 1441 and 1444 (see also FIG. 33). Depression of the key 42 (FIG. 22) thus rocks the bellcrank 1520, moves the link 1523 forward and lifts the link 1526 and the pin 1443 for causing lever 1441 to set shaft 560 for a subtotal cycle, rather than a total cycle, at the end of the multiplication operation.

XVI. PRODUCT TRANSFER (TX) OPERATION

The product transfer (T to X) key 44 produces a multiplication operation followed by a transfer of the product from the accumulator into the multiplier-storage unit. The product transfer key 44 (FIGS. 1, 17, 20 and 37) has a stem 1540 carrying a pin 1541 that overlies the bar 1503 on the multiplication key 38 (see also FIG. 17) so that depression of the product transfer key 44 depresses also the multiplication key 38. Stem 1540 also carries a pin 1542 which, as shown in FIG. 17, cooperates with the slot in the clutch bar 1083 for preventing depression of key 44 while the machine is in operation, and for alternatively locking it down.

At its lower end the "T to X" key stem 1540 carries a pin 1544 which lies in a slot 1545 of a floating bellcrank 1546 (FIGS. 20, 37 to 39, inclusive) having an L-shaped slot 1547 which embraces a pin 1548 fixed to the frame of the machine. A spring 1549 biases the bellcrank down and forward (counterclockwise in FIG. 20). A forward facing edge 1555 of the bellcrank 1546 bears against a pin 1556 on the bellcrank 1408 which drives the multiplication slide 1050 (FIG. 35). As is shown in FIG. 37, as the key stem 1540 is depressed, the bellcrank 1546 tends to rotate (clockwise in this view) substantially about the stationary pin 1556, the bellcrank 1546 moving from the dotted position 1546–a to the solid line position 1546–b, the slot 1547 accommodating this motion with respect to the fixed pin 1548.

It will be recalled that as the multiplication key 38 is depressed, it reaches a point at which the hook 1406 (FIGS. 20 and 35) disengages the pin 1411 so that the spring 1409 drives the bellcrank 1408 (clockwise in FIG. 20). As depicted in FIG. 38, this action causes another movement of the floating bellcrank 1546. As the bellcrank 1408 rotates clockwise, it carries the pin 1556 from the dotted position 1556–a down to the solid line position in a notch 1557 of the floating bellcrank 1546, thereby permitting the latter to move from the dotted position 1546–b forward to the solid line position 1546–c in FIG. 38, this motion being guided by the slots 1547 and 1545. The parts then occupy this solid line position in FIG. 38 until the multiplication slide 1050 is moved rearward at the end of the last multiplication cycle, and the bellcrank 1408 is rocked (counter-clockwise in these figures) to a position slightly beyond its home position shown in FIGS. 20 and 35. Since the notch 1557 of the floating bellcrank 1546 now embraces the pin 1556 on the bellcrank 1408 (FIG. 38), the floating bellcrank 1546 is lifted by this action of the bellcrank 1408 to the position shown in FIG. 39, the lower region of the slot 1547 accommodating this motion with respect to the pin 1548. As the bellcrank 1546 is thus lifted, a pin 1560 (FIGS. 20 and 39) is lifted against a cam face 1561 (FIG. 21) on the memory control link 1020. This action drives the memory control link forward (see also FIG. 17) for a memory input operation, as previously described. Consequently, when the machine goes into the total-taking operation, the number read from the accumulator into the actuator is also inserted in the memory unit. At the end of the combined total-taking and memory input cycle, the clutch bar 1083 (FIG. 17) releases the keys 38 and 44 to terminate the operation. As key 44 rises, it lifts the forward end of the bellcrank 1546 (FIG. 39). The pin 1548 in the slot 1547 constrains the bellcrank 1546 to rotate about the pin 1548 so that the notch 1557 is disengaged from the pin 1556, whereupon the bellcrank returns to the home position, as shown in FIG. 20, under force of the spring 1549 to complete the operation. It is to be noted that keys 40, 42 and 44 may be depressed simultaneously, since each imposes an independent modification upon the operation initiated by key 38 alone.

XVII. SYMBOLS FOR OPERATIONS BY THE LEFT SIDE CONTROL KEYS

At the extreme right of the print wheel cluster there is a print wheel 1738 (FIG. 11) for the left side control keys. It is the only print wheel for which no actuator sector is included in the main actuator. The drive gear 1739 for this print wheel is fixed to a gear sector 1740 which, in turn, is driven by a sector 1741 on a shaft 1742. This shaft extends through to the left side of the machine where it carries a gear sector 1743 (FIG. 17) in mesh with gear teeth on an arcuate lever 1744 which rocks free on the shaft 356. The screw 1745 on the forward extension of the actuator gear sector 372 overlies one arm of the lever 1744 for rocking it (clockwise in this view) to its home position shown, as the actuator gear sector 372 rocks to its home position. The screw 1745 moves up during the first part of each machine cycle for freeing the lever 1744 for rotation (clockwise in FIG. 17) for setting the symbol print wheel 1738 (FIG. 11). A stop lever 1746 (FIG. 19) has an ear 1747 that is arranged to be positioned over various steps 1751, 1753 and 1754 on the lever 1744 for limiting the motion of lever 1744 and thereby determining which symbol will be printed. A spring 1749, connected between the levers 1744 and 1746 (FIGS. 17 and 19), urges both of them counter-clockwise in these figures. Thus, during the second half of each machine cycle, as the actuator drive lever 372 returns to its home position, the screw 1745 drives the symbol setting lever 1744 clockwise to its home position, as shown in FIG. 17, where it is held by the stop lever 1746 (FIG. 19). In this position the lever 1744 sets the symbol wheel 1738 (FIG. 11) for printing an "X" to indicate the number in the multipler-storage, or memory, unit.

Stop lever 1746 (FIG. 19) carries a pin 1750 which lies in front of the upright arm of lever 1408, shown in FIGS. 20 and 35 which is rocked when the multiplication operation is initiated in response to the depression of the multiplication (=) key 38. During the multiplication operation, the lever 1408, through pin 1750, holds the stop lever 1746 forward to put ear 1747 (FIG. 19) in alignment with the step 1753. With the stop lever 1746 in this position, the lever 1744 swings clockwise during each machine cycle for setting the symbol print wheel 1738 for printing an equals (=) sign. However, as will be explained, this is printed only during the first multiplication cycle.

The stop lever 1746 is part of a bail 1756, the other arm 1757 of which appears in FIG. 23. The upper end of this arm lies in front of a pin 1758 on the negative equals bar 1510, so that forward motion of the bar 1510, upon the depression of the negative equals key (— =) 40, rocks the bail 1756 and the stop lever 1746 (FIG. 19) to put the ear 1747 in alignment with the step 1754. With stop lever 1746 in this position, the lever 1744 swings to the position for setting the symbol wheel 1738 (FIG. 11) to print a negative equals symbol (— =) for indicating that the product is entered into the accumulator subtractively. As will be described, this symbol is printed only during the first multiplication cycle.

XVIII. SYMBOL SUPPRESSION

A zero-foil mechanism is partly shown at 1640 in FIG. 13. This is similar to the well-known mechanism shown, for example, in U.S. Patent No. 2,779,267. This mechanism is controlled by a lever 1641 (FIG. 17), journalled at 1642, and engaged by a pin 1643 on a lever 1644 journalled at 356, and controlled by a zero-foil cam 1646.

A mechanism similar to the zero-foil mechanism is provided for blocking the print wheel 1698 (FIG. 12) for the right side keys during multiplication. Fixed to the drive gear 1739 and gear sector 1740 for the left side symbols is a cam 1765 for controlling a latch lever 1766 journalled at 1767. A spring 1768 biases the latch lever 1766 (clockwise in FIG. 12) for urging the end 1769 of a curved rear arm against the cam. Whenever the gears 1739, 1740 are set for printing an equals (=) or a negative equals (— =) symbol, a notch 1770 in the cam 1765 is aligned with the curved lever end 1769. An ear 1771 on an upper arm of latch lever 1766 is arranged to engage a shoulder 1772 on the print-wheel carrier 1611 of the right side symbol print wheel 1698 (which lies to the left of the left side symbol print wheel 1738). Latch lever 1766 is similar to a zero-foil latch, and is similarly controlled by a zero-foil bail 1773. In operation, just before the print bail 1617 is lowered to release all the print wheels for printing, zero-foil bail 1773 is moved (by cam 1646, FIG. 20) from the solid line position in FIG. 12 to the dotted line position 1773–a for freeing the latch lever 1766 (and all the zero-foil latches). If the notch 1770 of cam 1765 is aligned with the curved rear end 1769 of latch lever 1766, that lever will rock, under force of its spring 1768, to position ear 1771 over the shoulder 1772 of the print-wheel carrier 1611 of the right side symbol wheel 1698 and prevent it from printing. If drive gear 1739 is set for causing the left side symbol wheel to print an "X" for the memory, cam 1765 will hold ear 1771 clear of shoulder 1772 so that wheel 1698 will print.

The print wheel 1738 (FIG. 11), which is at the extreme right of the print-wheel cluster and prints the symbols for the left-side control keys, is also arranged to be blocked. Its print-wheel carrier 1779, similar to carriers 1611 for the number print-wheels, carries a pin 1780 which lies in a slot 1781 in a bellcrank 1782 which is journalled at 1783. The bellcrank 1782 includes an ear 1784 which is arranged to abut a pin 1785 on an arm 1786 on a shaft 1800. Pin 1780 and slot 1781 connect the bellcrank 1782 to the carrier 1779 of the print-wheel 1738 so that they rock together. Pin 1785 normally blocks bellcrank 1782 to prevent wheel 1738 from printing, but at times is swung clear of ear 1784 to permit such printing.

XIX. CONTROL OF SYMBOLS BY LEFT SIDE OPERATIONS

Shaft 1800 (FIG. 11) extends through the machine and at its left end (FIG. 20) is fixed to a lever 1801 which is biased (counter-clockwise in this figure) by a spring 1802. As seen in FIG. 22, shaft 1800 also carries a lever 1803 having at its lower end a pin 1804 which is normally engaged by a latch 1805 which holds it against the action of the spring 1802 (FIG. 20). Latch 1805 is journalled on the same shaft 1384 as the main multiplication lever 1322, and lies over a pin 1806 on the multiplication lever.

The lever 1801 (FIG. 20) carries a pin 1810 which lies behind the projection 1052 (FIG. 18) on the drive link 1028 for the clearing bail of the memory unit. Thus when the drive link 1028 is driven rearward during a memory input or memory output operation, the projection 1052 drives against the pin 1810 for causing a small rocking motion of the lever 1801 clockwise in FIG. 20, this rotation being unopposed by the latch 1805 in FIG. 22.

This rocking of shaft 1800, when the memory clearing bail is operated, rocks the lever 1786 (FIG. 11) for releasing the bellcrank 1782 so that the left side symbol print-wheel 1738 is free to print. Under this condition, wheel 1738 is set for printing the symbol "X."

An operation initiated by the multiplier entry (X) key 36, prints two symbols "N X." An operation in which the memory input (MI) key 48 is used, prints an "X" along with the symbol of the right side operation, for example, "T X." The memory output (MO) key 50 similarly causes an "X" to be printed along with a right side symbol. It will be recalled that the memory output (MO) key 50 causes the number in the memory unit to be transferred to the actuator, printed, and returned to the memory unit. Thus, the symbol "X" indicates that the number so printed is in the memory unit. If the "MO" key 50 is used with one of the keys 14, 16 or 20, it will print the appropriate right side symbol too, for example, "+ X."

When the multiplication lever 1322 is rocked as previously described (counter-clockwise in FIG. 22) at the beginning of the multiplication operation, pin 1806 lifts the latch 1805 for disengaging the pin 1804 and releasing the shaft 1800 and the lever 1801 for rotation (counter-clockwise in FIG. 30) under the pull of the spring 1802. This rotation of shaft 1800 lifts pin 1785 (FIG. 11) for unblocking lever 1782, permitting the printing of the left side symbols. Accordingly, the multiplicand in the selector unit is printed during the first cycle of the multiplying operation along with an equals (=) symbol.

During subsequent cycles of the multiplication operation, shoulder 1825 of lever 1801 blocks arm 1831 of lever 1657 and thereby suppresses all printing, as described in the copending applications previously referred to.

As described in connection with FIGS. 32 and 34, the multiplication bar 1050 is moved rearward late in the last cycle of the multiplication operation for, among other things, setting the lever 1444 for the total or subtotal operation which follows immediately. As the equals bar 1050 is driven rearward, an ear 1835 drives against a pin 1836 (FIG. 22) on the lever 1803 for rocking it and the shaft 1800 (clockwise in this view). This restoration of the shaft 1800 substantially to its home position, returns the lever 1801 (FIG. 20) to its home position and frees the lever 1657 to permit printing during the total-taking cycle. In FIG. 11, the pin 1785 on the lever 1786 again blocks the lever 1782 for blocking the printing of multiplication symbols.

The restoration of the equals bar 1050 (FIG. 35) has rocked the lever 1408 rearward (counter-clockwise in FIG. 35) and, through pin 1750, has freed the stop lever 1746 (FIG. 19) to swing rearward to its home position shown in that figure. In this position, it will, during the next cycle (the total-taking cycle), set the drive gear 1739 (FIG. 12) for an "X" symbol. With this setting, the notch 1770 will be away from the end of the arm 1769 so that the print wheel 1698 for the right side symbols will be free to print.

Thus, at the end of a multiplication operation initiated by the "equals" key 38, or the "negative equals" key 40, the total is printed out with a symbol "T" or "T̄." After an accumulative equals operation (key 42), a subtotal is printed with a symbol "S" or "S̄." After an operation initiated by the product transfer (T to X) key 44, the total is printed out with two symbols, for example, "T X."

XX. OPERATIONAL CONTROL OF SYMBOLS

It will be noted that the right side symbols are not controlled directly by the keys 14, 30, etc., but rather by the add-subtract shaft 696, the total-subtotal shaft 560, and the credit-balance indicator 536, which control the accumulator operations. Because of this arrangement, no extra controls are required for matching the symbols to modified operations.

Some of the left side symbols are also controlled by the machine operations and not directly by the keys. Thus, the left side symbols are unblocked for printing only by the rocking of shaft 1800 (FIG. 11), either by link 1028 (FIG. 18) driving against pin 1810, or by the main multiplication lever 1322 (FIG. 22) lifting latch 1805. Also, the multiplication symbol (=) is set by bellcrank 1408 (FIGS. 20 and 35) driving against pin 1750 (FIG. 19). If the multiplication key 38 is depressed when the number of orders occupied in the memory and selector exceeds the capacity of the machine, plate 1066 is blocked, as in FIG. 27, so that movement of bar 1050 (FIG. 35) is prevented, cam 1402 is deflected, and a print-only operation results. The print wheel 1738 for the left side symbol is left blocked, and furthermore, is left set at "X" so that the right side symbol print-wheel 1698 is not blocked by the mechanism of FIG. 12. Accordingly, the symbol "N" is printed to indicate the print-only operation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. In combination in an automatic calculating machine, a multiplier-storage register including a differentially settable member for each numerical order, each said member having a serrated edge, a detent for each said member engaging a serrated edge thereof for releasably holding said member in any of a plurality of differentially set positions, means responsive to the set positions of said members for controlling a multiplication operation by said machine, control means operable for initiating a multiplication operation, and means responsive to an initiation of a multiplication operation by said control means for blocking said detents for holding them in the serrations of said edges for thereby locking said differentially settable members.

2. A multiplying calculating machine comprising in combination, a manually operable multiplication key, a control member having a yieldable connection to said key for movement thereby, over-capacity test mechanism arranged to block movement of said control member in an over-capacity situation, said yieldable connection being operable to permit movement of said member by said key if movement of said member is unobstructed by said over-capacity test mechanism, said yieldable connection permitting operation of said key when said control member is blocked, means responsive to an operation of said key and said movement of said control member thereby for initiating a multiplication operation, and means responsive to an operation of said key when said control member is so blocked for initiating an operation that reduces the over-capacity condition.

3. The combination of the immediately preceding claim wherein there is included a multiplicand register and wherein operation of said key when said control member is blocked initiates an operation of said machine that clears said multiplicand register.

4. The combination of claim 2 wherein operation of said key when said control member is blocked initiates an operation that eliminates one factor of the multiplication.

5. The combination of claim 2 wherein operation of said key when said bar is blocked initiates a print-only operation of said machine.

6. The combination of claim 2 wherein there is included symbol printing means, wherein movement of said control member for initiating a multiplication operation also sets the machine for printing a multiplication symbol.

7. In a multiplying calculating machine, a multiplicand register, a multiplier register, a manually operable multiplication key, a movable control member having a yieldable connection to said key for movement thereby, over-capacity test mechanism responsive to the filled orders of said registers for blocking movement of said control member in an over-capacity situation, said yieldable connection being operable to permit movement of said control member by said key if movement of said member is unobstructed by said over-capacity test mechanism, said yieldable connection permitting operation of said key when said control member is blocked as aforesaid, means responsive to operation of said key and said movement of said control member thereby as aforesaid for initiating a multiplication of numbers in said two registers, and means responsive to operation of said key when said control member is blocked as aforesaid for initiating an operation that clears filled orders in one of said registers.

8. The combination of claim 7 wherein operation of said key when said control member is blocked initiates an operation that moves one of said registers toward the right.

9. The combination of claim 7 wherein operation of said key when said control member is blocked, initiates an operation that clears one of said registers.

10. In a multiplying calculating machine, a multiplier register, a movable multiplicand register having a clearing position, said multiplicand register being movable to said clearing position for clearing said multiplicand register, a manually operable multiplication key, a movable control member having a yieldable connection to said key for movement thereby, over-capacity test mechanism arranged to block movement of said control member in an over-capacity situation, said yieldable connection being operable to permit movement of said member by said key when movement of said member is not obstructed by said over-capacity mechanism, said yieldable connection permitting operation of said key when said control member is blocked, means responsive to an operation of said key and said movement of said control member thereby as aforesaid for initiating a multiplication of the numbers in said two registers, and means responsive to said operation of said key when said control member is blocked as aforesaid for initiating an operation that moves said multiplicand register toward said clearing position.

11. In an automatic function control for a calculating machine, a lever having a hook portion including a face abutment and a shoulder abutment adjacent said face abutment, guide and support means for said lever permitting limited translational motion of said lever, and permitting rotation of said lever about a guided part thereof spaced from said hook portion, an operating member adjacent said hook portion for engagement with said face and shoulder abutments of said hook portion, bias means urging said lever in a first direction along a line between said hook portion and said guide part, and also in a second direction transverse to said line, said guide means limiting the movement of said lever in said first and second directions, said face abutment facing generally in said second direction and said shoulder abutment facing generally in said first direction, setting means imparting a first rotation to said lever about said guided part for rocking said face abutment against said control member as a fulcrum and thereby moving said guided part against the force of said bias means and generally opposite to said second direction, said operating member being movable first in said first direction for disengaging said face abutment and permitting movement of said lever in said second direction under force of said bias means, and then opposite said first direction for driving against said shoulder abutment for moving said lever opposite said first direction against the force of its bias, said lever being rotatable about said guided part opposite said first rotation for moving said hook portion generally opposite said first direction for disengaging said shoulder abutment from said operating member and permitting movement of said lever in said first direction under force of its bias, and control means operated by the aforesaid movement of said lever opposite said first direction by said operating member.

12. The combination of claim 11 wherein said operating member is moved with the control for one machine function, and said control means controls a second machine function, whereby said setting means controls said second function to accompany said first machine function.

13. The combination of claim 11 wherein there is included a multiplication control for initiating automatic multiplication, a multiplier register, a product register, and transfer means for transferring a product from said product register to said multiplier register, and wherein said operating member is moved with said multiplication control, and said control means actuates said transfer means for taransferring a product to said multiplier register.

References Cited by the Examiner
UNITED STATES PATENTS

| | | | |
|---|---|---|---|
| 2,560,910 | 7/51 | Toorell | 235—204.54 |
| 2,650,027 | 8/53 | Avery | 235—130 |
| 2,749,040 | 6/56 | Parker | 235—130 |
| 2,905,382 | 9/59 | Carnacina | 235—60 |
| 2,970,754 | 2/61 | Gang | 235—60 |
| 3,005,585 | 10/61 | Capellaro | 235—60 |
| 3,016,188 | 1/62 | Lydfors | 235—204.01 |

LEO SMILOW, *Primary Examiner.*

UNITED STATES PATENT OFFICE
CERTIFICATE OF CORRECTION

Patent No. 3,212,704
October 19, 1965

Harold J. Chall et al.

It is hereby certified that error appears in the above numbered patent requiring correction and that the said Letters Patent should read as corrected below.

Column 3, line 13, for "substract" read -- subtract --; column 4, line 36, for "to" read -- of --; column 5, line 7, for "left-" read -- left --; column 8, line 28, for "left" read -- lift --; line 32, for "swifting" read -- shifting --; column 9, line 14, for "substractive" read -- subtractive --; line 28, for "(FLG. 25)" read -- (FIG. 25) --; column 10, line 12, for "gear" read -- gears --; line 41, for "added" read -- add --; line 49, for "carry-" read -- carrying --; column 11, line 10, for "operation" read -- operations --; column 13, line 56, for "multiplicant" read -- multiplicand --; line 62, for "wil" read -- will --; column 14, line 20, for "arms" read -- cams --; line 25, for "99" read -- 999 --; line 26, for "poistion" read -- position --; column 16, line 10, for "multiplier storage" read -- multiplier-storage --; line 75, for "controll" read -- control --; column 17, line 5, for "life" read -- lift --; column 18, line 40, for "substract" read -- subtract --; column 19, line 74, strike out "the", second occurrence; column 20, lines 3 and 4, for "option" read -- operation --; column 27, line 44, for "a" read -- the --; column 30, line 9, for "taransferring" read -- transferring --.

Signed and sealed this 5th day of July 1966.

(SEAL)
Attest:

ERNEST W. SWIDER
Attesting Officer

EDWARD J. BRENNER
Commissioner of Patents